(12) United States Patent
Hofrichter et al.

(10) Patent No.: US 7,260,597 B1
(45) Date of Patent: Aug. 21, 2007

(54) REMOTE MANUAL, MAINTENANCE, AND DIAGNOSTIC SERVICES FOR NETWORKED ELECTRONIC DEVICES

(75) Inventors: Klaus Hofrichter, Santa Clara, CA (US); Joseph Alexander Dara-Abrams, Los Altos, CA (US); David Gabriel Gaxiola, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 665 days.

(21) Appl. No.: 09/705,478

(22) Filed: Nov. 2, 2000

(51) Int. Cl.
G06F 11/00 (2006.01)
G06F 17/30 (2006.01)

(52) U.S. Cl. .................. 709/200; 709/228; 707/10; 707/101; 707/102; 714/46; 714/48

(58) Field of Classification Search .......... 709/220, 709/223, 224, 221, 222, 200, 208, 228; 345/705, 345/714; 707/2, 102, 10, 229; 705/27, 29, 705/34, 400; 715/843, 513; 702/184; 700/9; 714/46, 31; 725/80, 82; 340/657, 292
See application file for complete search history.

(56) References Cited

U.S. PATENT DOCUMENTS

| | | | | |
|---|---|---|---|---|
| 5,594,663 | A * | 1/1997 | Messaros et al. ........... | 702/184 |
| 5,678,002 | A * | 10/1997 | Fawcett et al. ............. | 345/709 |
| 5,961,561 | A * | 10/1999 | Wakefield, II ............... | 701/29 |
| 5,964,891 | A * | 10/1999 | Caswell et al. .............. | 714/31 |
| 6,014,651 | A * | 1/2000 | Crawford .................... | 705/400 |
| 6,023,507 | A * | 2/2000 | Wookey ...................... | 709/224 |
| 6,167,448 | A * | 12/2000 | Hemphill et al. ........... | 709/224 |
| 6,198,479 | B1 * | 3/2001 | Humpleman et al. ....... | 345/733 |
| 6,321,262 | B1 * | 11/2001 | Springer .................... | 709/223 |
| 6,371,765 | B1 * | 4/2002 | Wall et al. .................. | 434/224 |
| 6,473,788 | B1 * | 10/2002 | Kim et al. .................. | 709/209 |
| 6,505,243 | B1 * | 1/2003 | Lortz ......................... | 709/220 |
| 6,539,499 | B1 * | 3/2003 | Stedman et al. ............ | 714/40 |

(Continued)

OTHER PUBLICATIONS

Office Action dated Oct. 18, 2004 in U.S. Appl. No. 09/705,472.

Primary Examiner—Jeffrey Pwu
Assistant Examiner—Jude Jeam-Gilles
(74) Attorney, Agent, or Firm—Haverstock & Owens LLP

(57) ABSTRACT

A process is provided for identifying and managing support service applications associated with consumer electronic devices. The process is executed by a gateway device communicatively coupled with each of the electronic devices via a home network, the gateway device being operative to access the Internet and being communicatively coupled with a display unit. The process includes the steps of: determining device ID information associated with a selected one of the electronic devices for which a support service application is required; providing the device ID information to a selected server computing system via the Internet; downloading a support service application associated with the selected device from the selected server computing system; and executing the downloaded support service application at the gateway device to provide a remote interactive support service process for the selected device. The support service may include a remote interactive manual service providing educational instructions to a user of the home network system regarding operation of a selected device, a remote interactive maintenance/diagnostic service for instructing a home network system user in solving maintenance problems associated with a selected device, or a combination remote interactive manual/maintenance/diagnostic service.

54 Claims, 8 Drawing Sheets

U.S. PATENT DOCUMENTS

| | | | |
|---|---|---|---|
| 6,542,897 B2 * | 4/2003 | Lee | 707/102 |
| 6,647,532 B1 * | 11/2003 | Boede et al. | 715/513 |
| 6,694,314 B1 * | 2/2004 | Sullivan et al. | 707/10 |
| 6,701,524 B1 * | 3/2004 | Okamura et al. | 725/37 |
| 6,803,854 B1 * | 10/2004 | Adams et al. | 340/531 |
| 6,853,958 B1 * | 2/2005 | Turin et al. | 702/188 |
| 2002/0111950 A1 * | 8/2002 | Lee | 707/100 |

* cited by examiner

REMOTE MANUAL, MAINTENANCE, AND DIAGNOSTIC SERVICES FOR NETWORKED ELECTRONIC DEVICES

CROSS REFERENCE TO RELATED APPLICATIONS

Reference is made to U.S. patent application entitled "Residential Gateway System For Managing Service Applications Associated With Electronic Devices", Ser. No. 09/705,472, filed on Nov. 2, 2000, and also to U.S. patent application entitled "Content and Application Download Based On A Home Network System Configuration Profile" Ser. No. 09/705,442, filed on Nov. 2, 2000.

BACKGROUND OF THE INVENTION

1. Field of the Invention

The present invention relates generally to home network systems, and more specifically to a system and method for providing remote interactive support services for networked electronic devices.

2. Description of the Prior Art

The proliferation of multimedia technology has spawned a growth in the number and diversity of different consumer electronics devices commonly found in the average home. Such devices may include personal computers, workstations, digital televisions, Personal Video Recorders (PVR's), set-top boxes, digital video recorders, game devices, personal digital assistants (PDA's), printers, audio devices (e.g., jukebox AV systems, CD players and mini-disc players), and audio/video (AV) hard drives.

Although ownership of a variety of electronic devices provides a user with an enhanced living experience, the use and maintenance of all of these devices can be very complicated and can cause frustration even to a more technically astute user. This problem is partially due to the fact that each of the devices requires a different operational procedure, and, should there be problems with expected behavior, requires different replacement parts and maintenance. The problem is often exacerbated when a user owns devices made by different manufacturers because if the devices require service, they may need to be shipped to different service centers.

Consumers of electronic devices typically rely on printed manuals provided with the devices for the purpose of learning about operation, routine maintenance, and diagnosis of problems associated with the devices. While printed manuals may be helpful, they can also be difficult to read and understand. Also, a printed manual often does not provide an adequate description of all problems likely to occur with the device because the manual is typically written before the device has been used in the field by consumers for a period of time adequate to discover the full range of problems users may experience with the device. As an example, after launching a device to market, a vendor may learn that a large number of users tend to make a particular mistake in operating the device, and the authors of the printed manual may not have anticipated this problem. As another example, after launching a device to market, the vendor may discover a mechanical failure that commonly occurs in the device, and the manual may not describe solutions for this problem when writing the manual.

In order to provide automatic trouble shooting features, some consumer electronic devices are equipped with self diagnostic systems. As an example, a device may include a processor, executable instructions burned onto a ROM for performing self-diagnostic functions, and display means for indicating a detected problem. However, these self diagnostic systems are usually quite limited and can also be very expensive to implement.

Because printed manuals, and self diagnostic features are often insufficient to solve all problems that a user may have with a particular consumer electronics device, vendor support services are often required for diagnosing problems associated with electronic devices. However, because each of the devices may be provided by a different manufacturer, the process of contacting vendor service centers for help, and shipping the device back and forth for maintenance and repair can be very tedious and expensive.

Modern home network systems provide interoperability of a variety of different types of electronic devices used in a common home environment. It is common that at least one of the devices in a home network system, such as a PC, will be configured to access the Internet. The Open Services Gateway Initiative (OSGi) is an industry group working to define and promote an open standard for connecting the coming generation of smart consumer and small business appliances with commercial Internet services. The Open Services Gateway specification will provide a common foundation for Internet Service Providers, network operators and equipment manufacturers to deliver a wide range of e-services via gateway servers running in the home or remote office. However, there is as yet no system and method for providing e-services for operating, maintaining, and diagnosing problems associated with consumer electronic devices via gateway servers running in the home or remote office.

What is needed is an improved method and apparatus for providing support services to consumers for assisting the consumers in operating, maintaining, and diagnosing problems associated with consumer electronic devices.

SUMMARY OF THE INVENTION

It is an object of the present invention to provide a home network system architecture and process for identifying electronic devices for which an associated application is needed in order to interact with the device remotely.

It is an object of the present invention to provide a home network system architecture and process that is operative to identify and access applications that are needed in order to remotely interact with specified devices in the home network system.

Briefly, a presently preferred embodiment of the present invention provides a process of identifying and managing support service applications associated with consumer electronic devices in a home network system. A client side process, executed by a client computing system in the home network, operates in conjunction with a server side process executed by a server computing system that is communicatively coupled with the client computing system via the Internet. In one embodiment, the client computing system is implemented by a gateway device communicatively coupled with each of the electronic devices via the home network. The gateway device is operative to access the Internet and is communicatively coupled with a display unit.

The client side process executed by the gateway device includes the steps of: determining device ID information associated with a selected one of the electronic devices for which a support service application is required; providing the device ID information to a selected server computing system via the Internet; downloading a support service application associated with the selected device from the selected server computing system; and executing the downloaded support service application at the gateway device to provide a remote interactive support service process for the selected device. The device ID information includes vendor information indicative of the vendor of the particular device, model information indicative of the model of the particular device, and a serial number of the particular device.

The support service may include a remote interactive manual service providing educational instructions to a user of the home network system regarding operation of the selected device, a remote interactive maintenance/diagnostic service for instructing a home network system user in solving maintenance problems associated with the selected device, or a combination remote interactive manual/maintenance/diagnostic service.

The remote interactive diagnostic process executed by the gateway device includes the steps of: communicating with the selected device via the home network in order to determine a current functional state of the selected device; and displaying information indicative of the current functional state of the selected device on the display unit. The diagnostic process further includes the steps of: determining diagnostic information based on the current functional state of the selected device, the diagnostic information indicating a problem associated with the selected device; and displaying the diagnostic information on the display unit.

The server side process executed by the server computing system includes the steps of: receiving device ID information from a client computing system, the device ID information indicating a particular consumer electronic device; accessing a selected support service application associated with the particular device based on the device ID information; and providing the selected support service application associated with the particular device to the client computing system, the application including instructions executable by the client computing system for providing an interactive support service process associated with the particular device.

In one embodiment, the selected support service application includes instructions executable by the client computing system for diagnosing problems associated with the particular device by communicating with the particular device. In this embodiment, the server computing system receives diagnosis information from the client computing system, the diagnosis information indicating a diagnosed problem associated with the particular device that is determined as a result of execution of the support service application by the client computing system. The server computing system is operative to create a database record based on the diagnosis information and the device ID information, the record indicating the diagnosed problem associated with the particular device. Database records generated by the server computing system may be used to accumulate data describing difficulties commonly experienced by users of specific consumer electronic devices, as well as common maintenance problems associated with the electronic devices. This information may be used to update the remote interactive manual/maintenance/diagnostic services.

Important advantages of the remote interactive manual, maintenance, and diagnostic services of the present invention is that they provide more comprehensive education about operation of the devices, and also enable a user to more easily trouble shoot problems with the devices.

Another important advantage of the of the remote interactive services of the present invention is that the transmission of diagnostic information to the server computing system enables manufacturers of consumer electronic devices to accumulate data describing difficulties commonly experienced by users of specific consumer electronic devices, as well as common maintenance problems associated with the electronic devices. Finally, this information may be used to update the remote interactive manual/maintenance/diagnostic services. This feature solves the above described problems associated with printed manuals.

The foregoing and other objects, features, and advantages of the present invention will become apparent from the following detailed description of the preferred embodiment which makes reference to the several figures of the drawing.

In the Drawing

Figure 3:
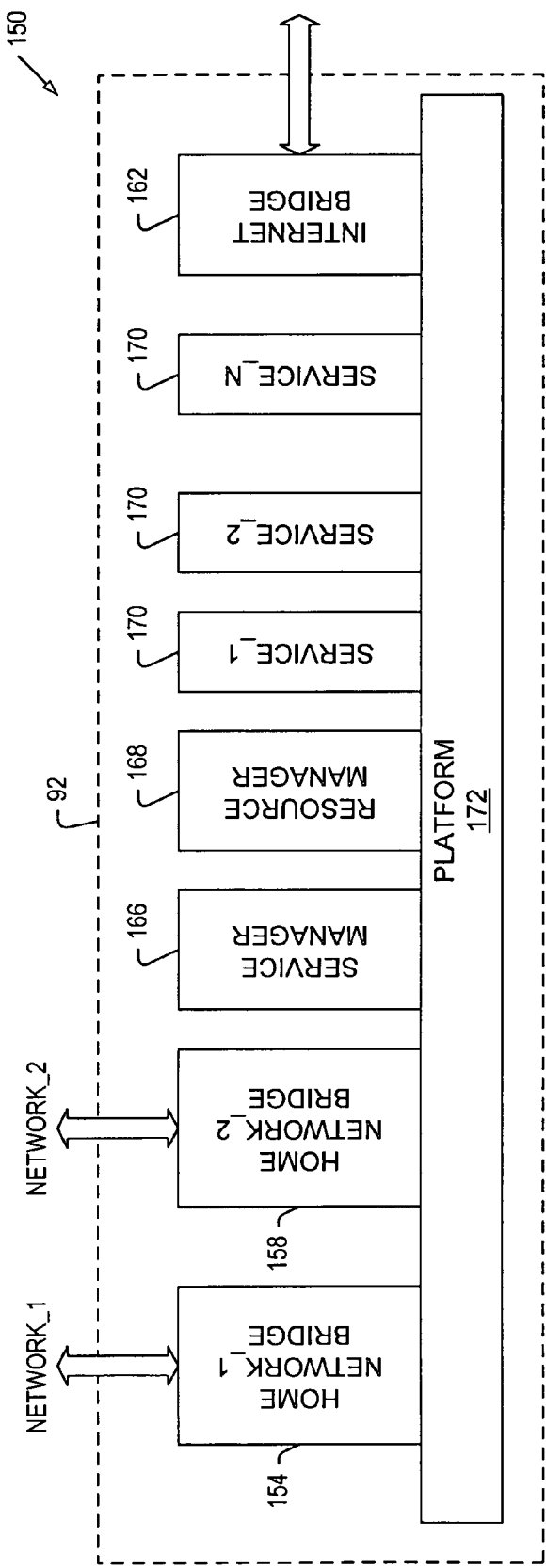
Figure 4:
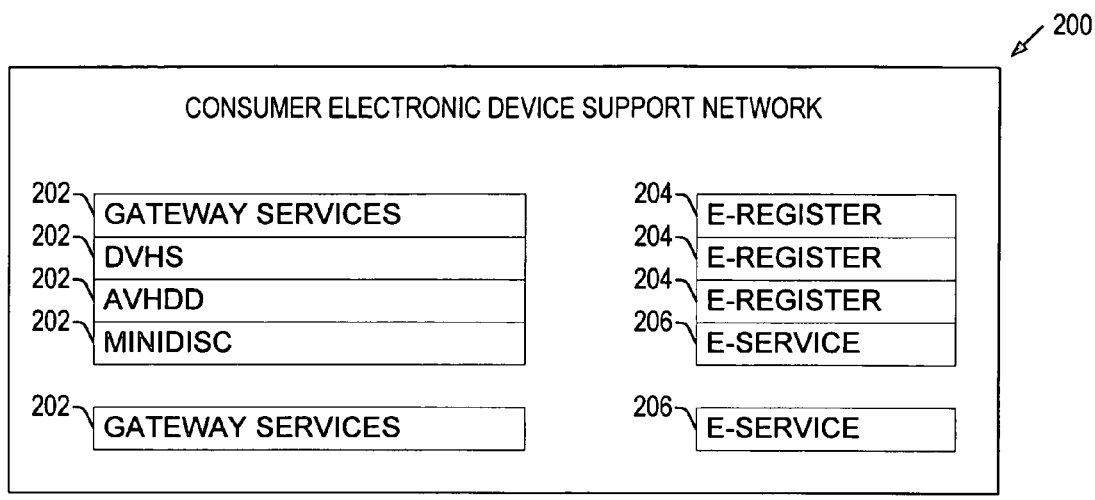
Figure 5:
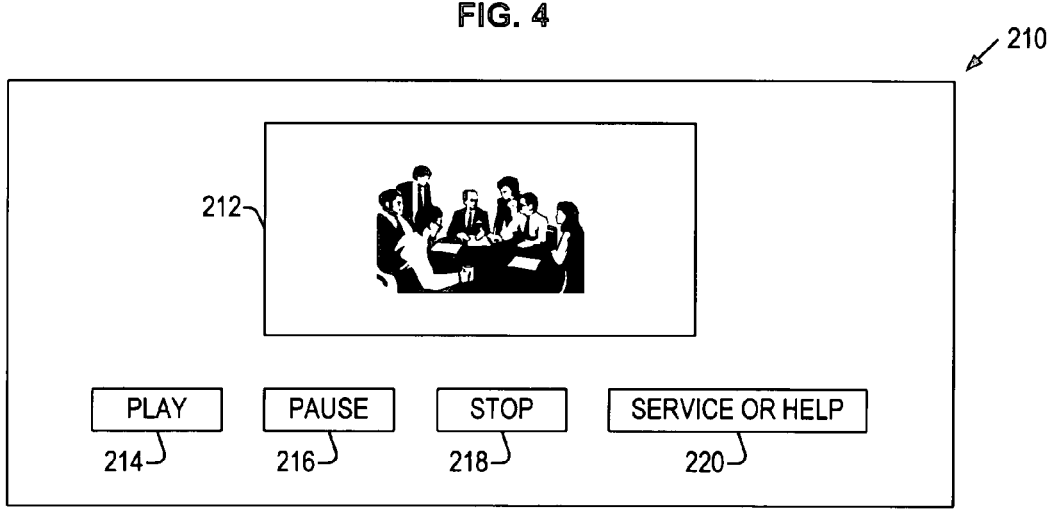
Figure 6:
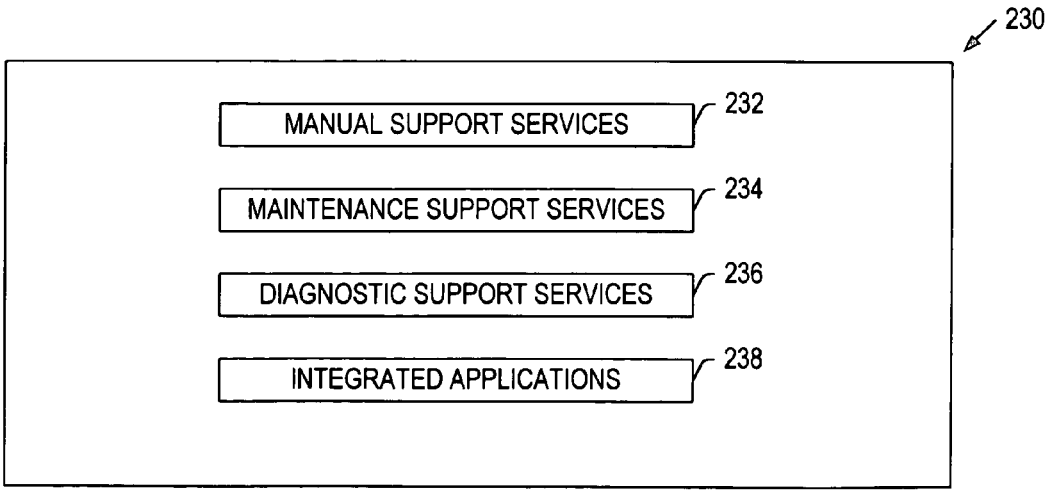
Figure 7:
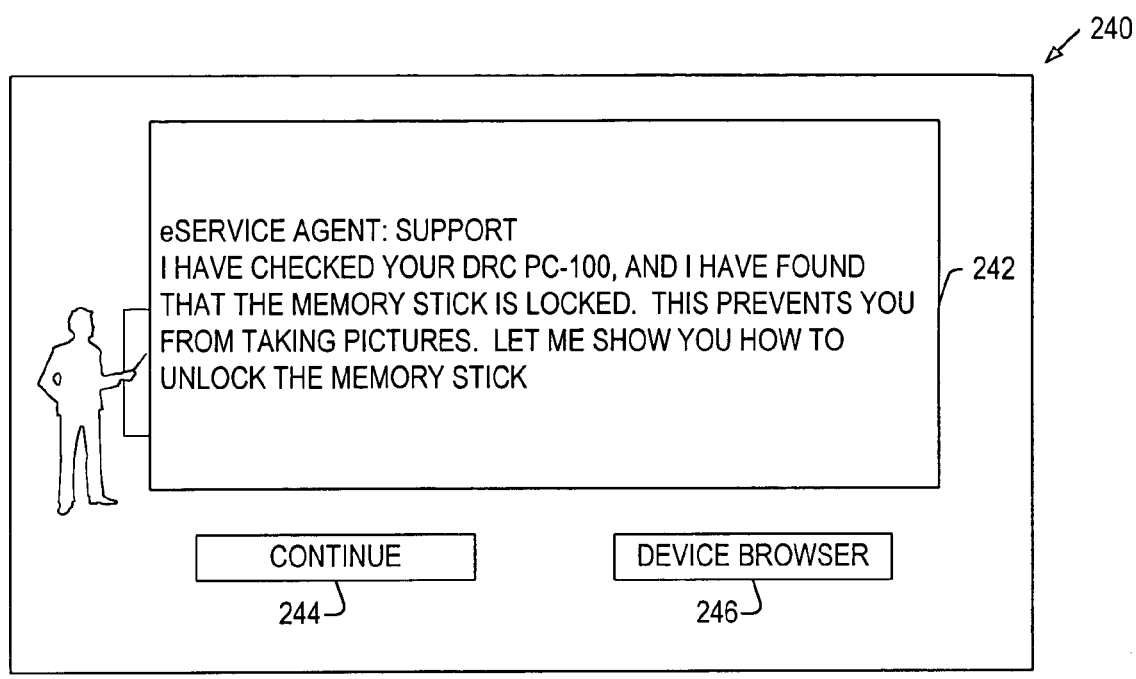
Figure 8:
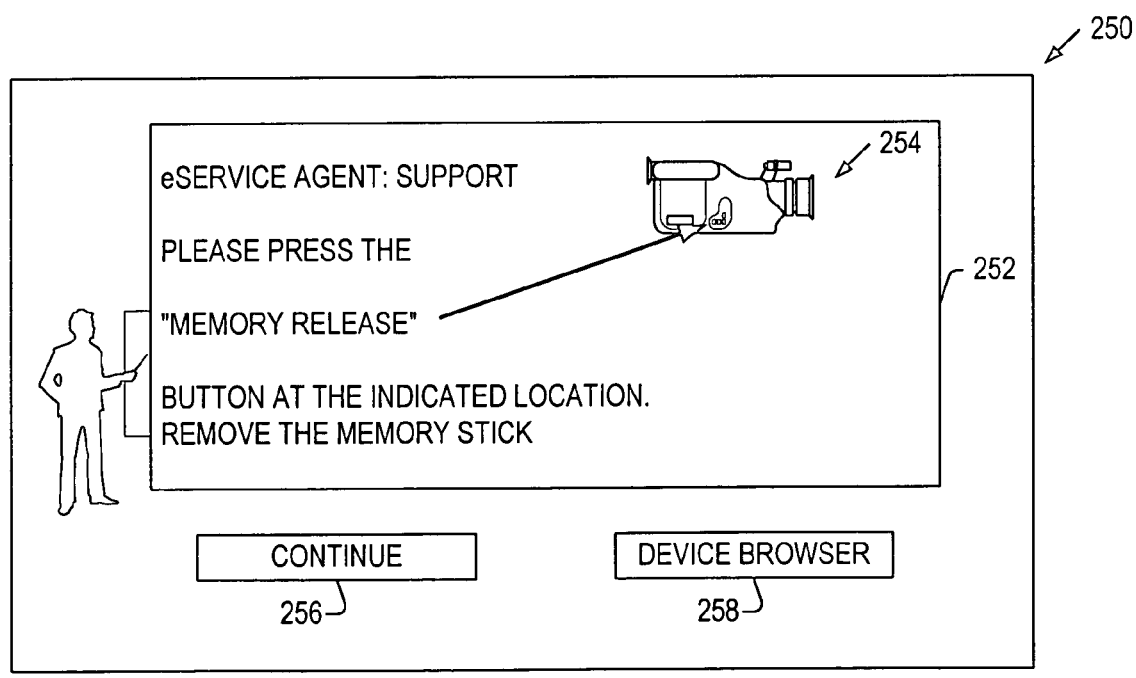
Figure 9:
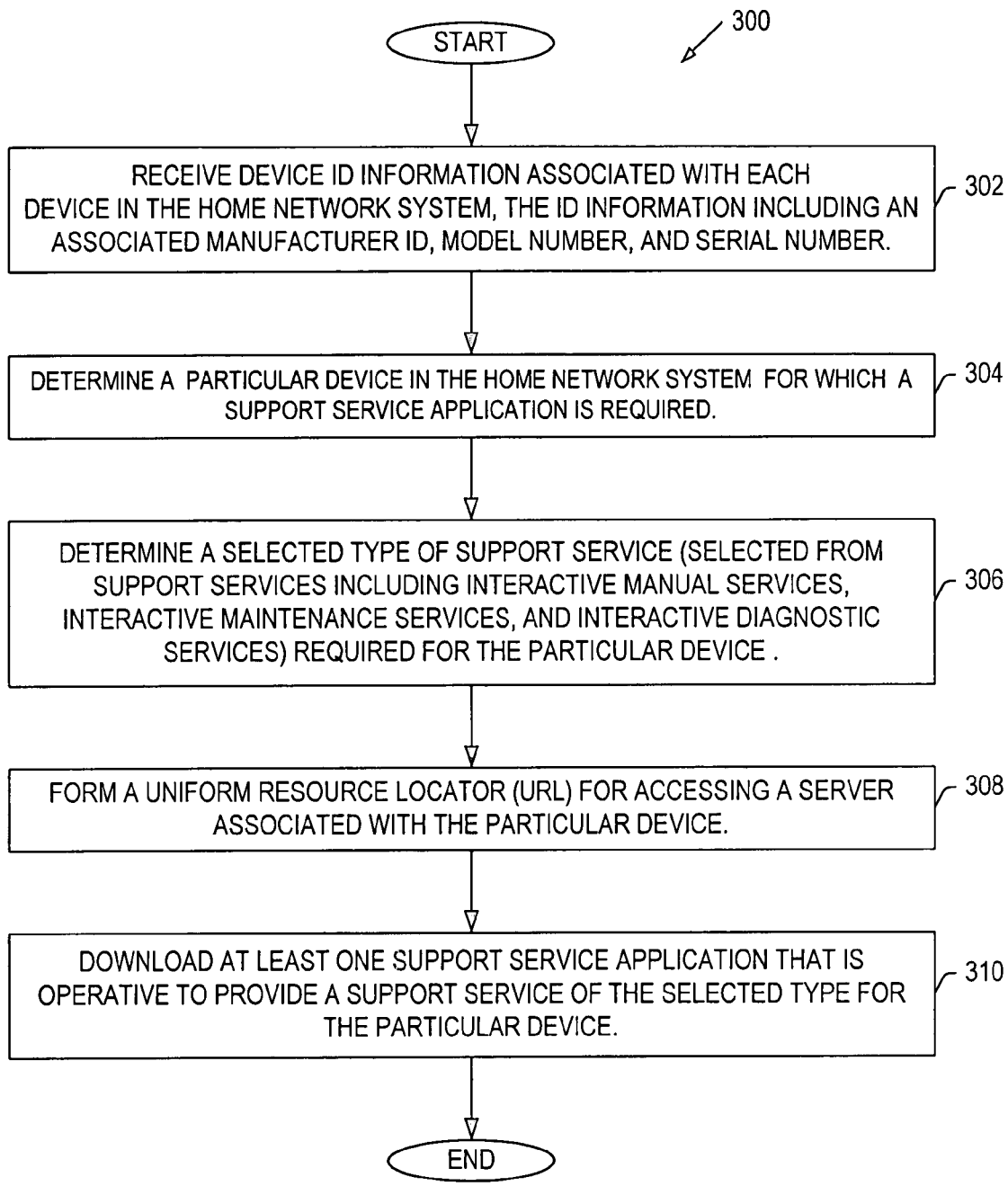
Figure 10:
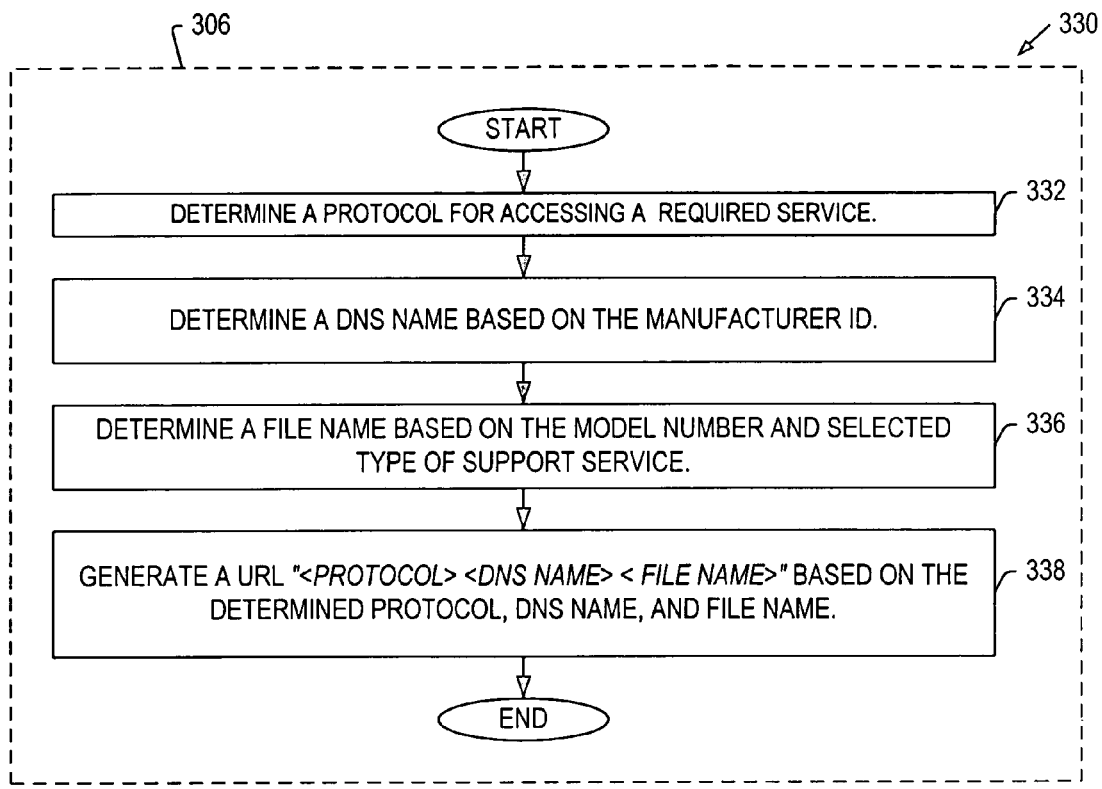
Figure 11:
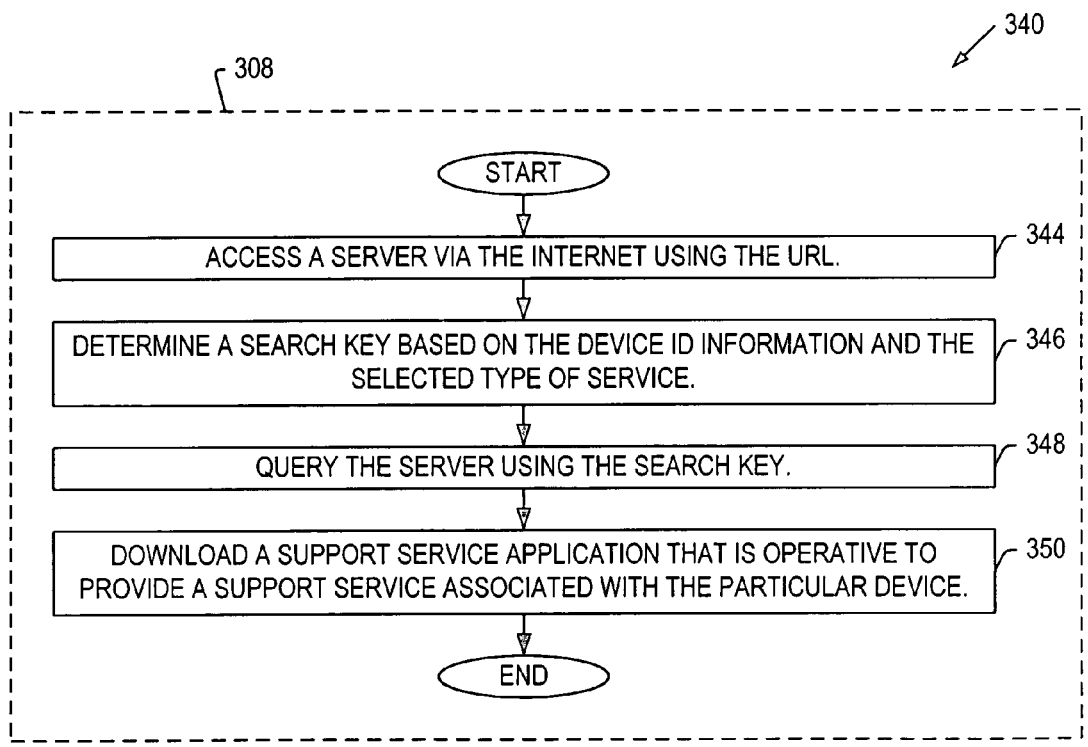
Figure 12:
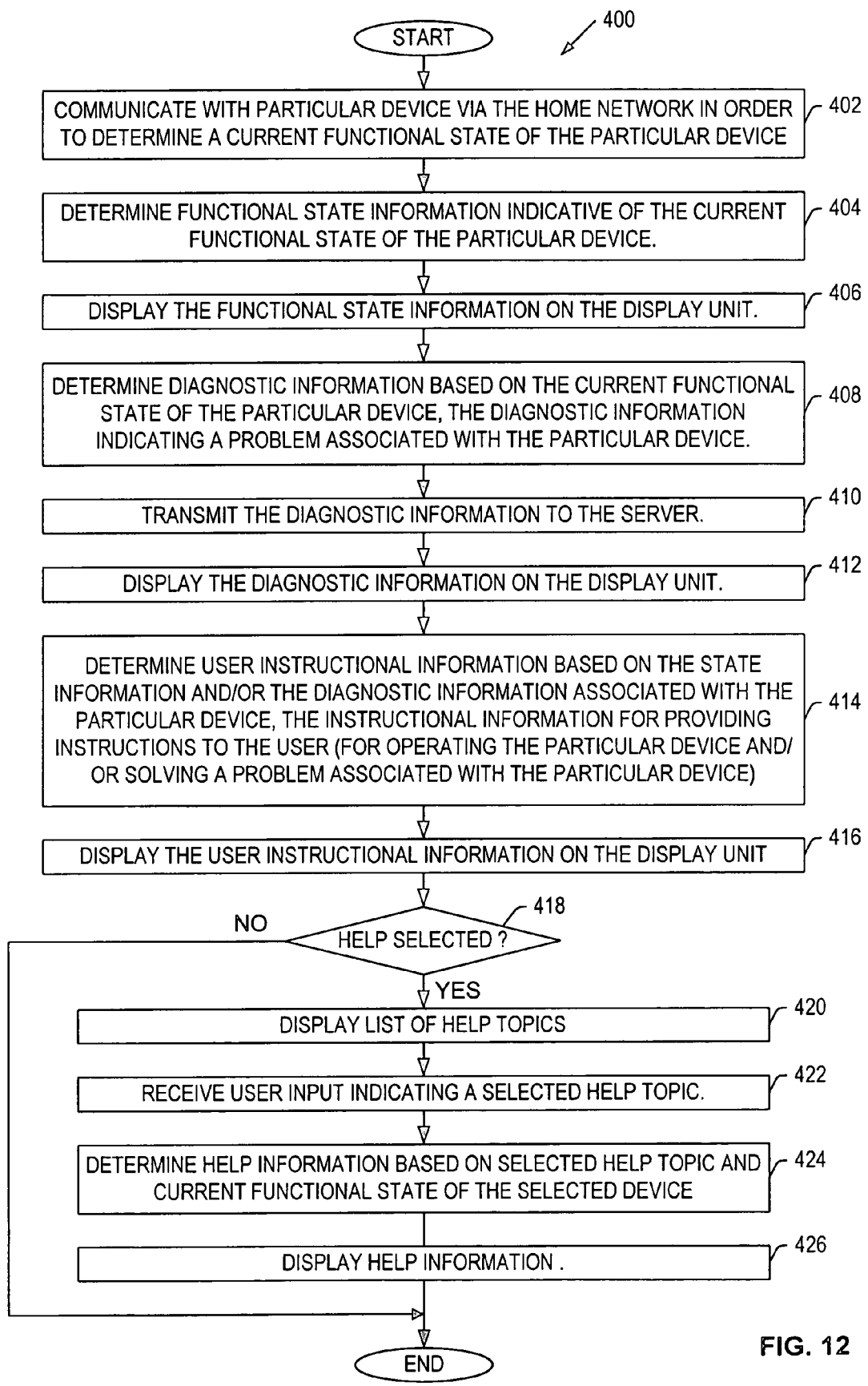
Figure 13:
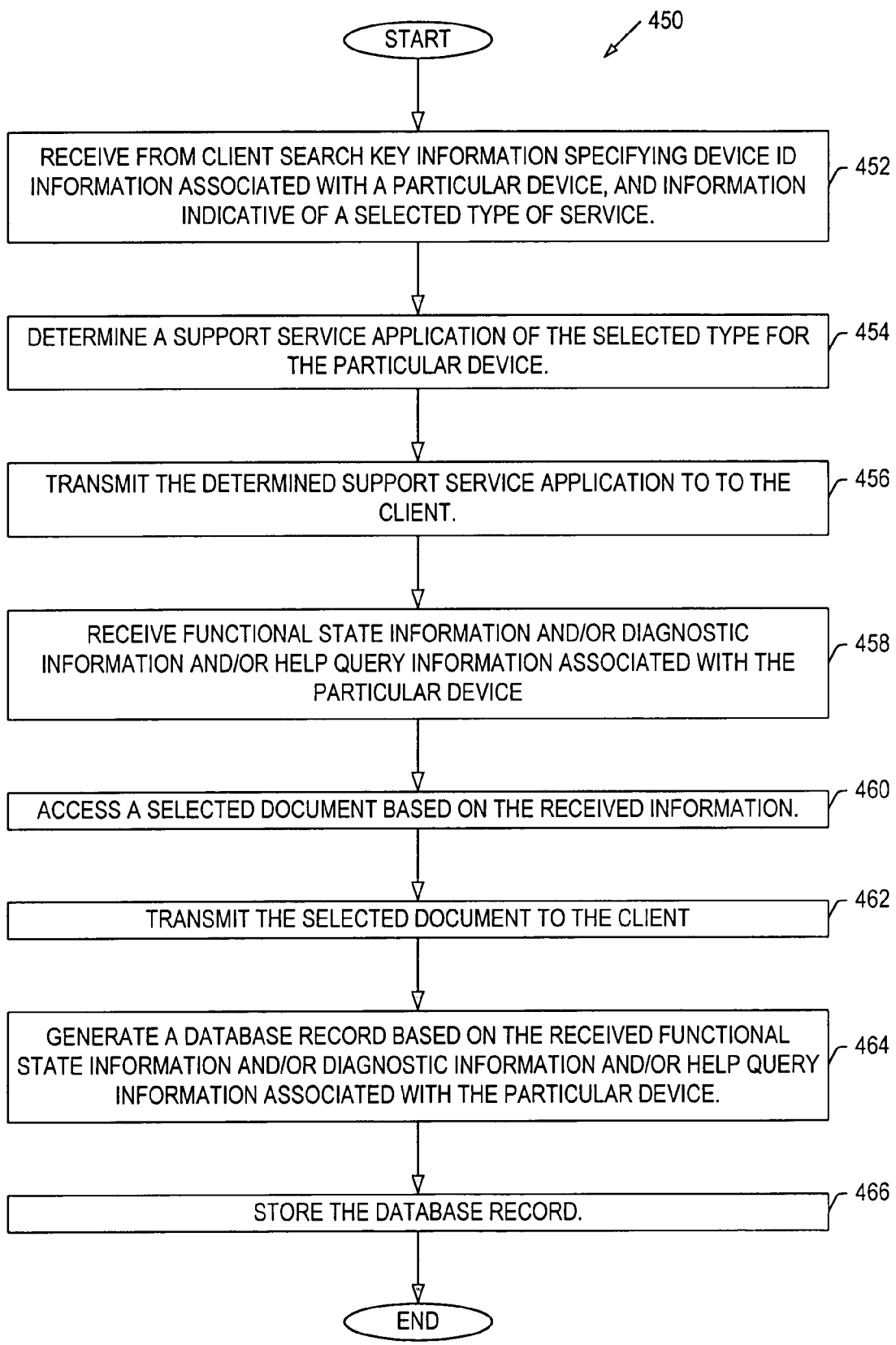
Figure 3:
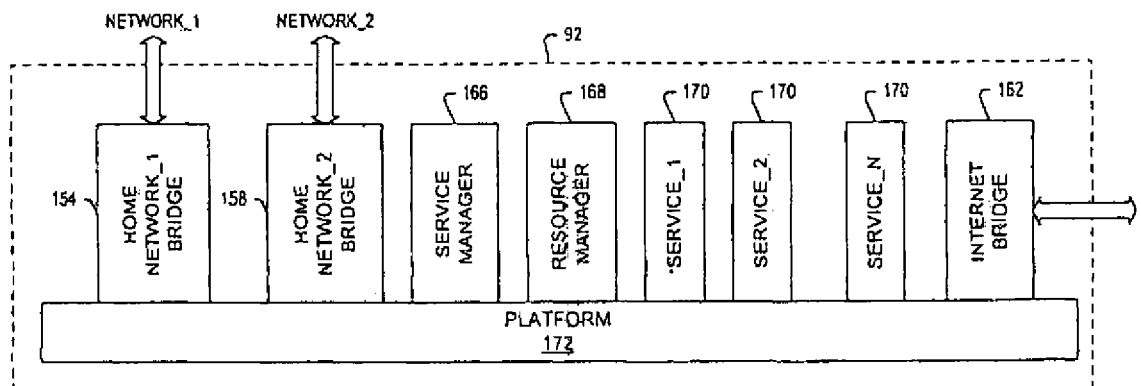
Figure 10:
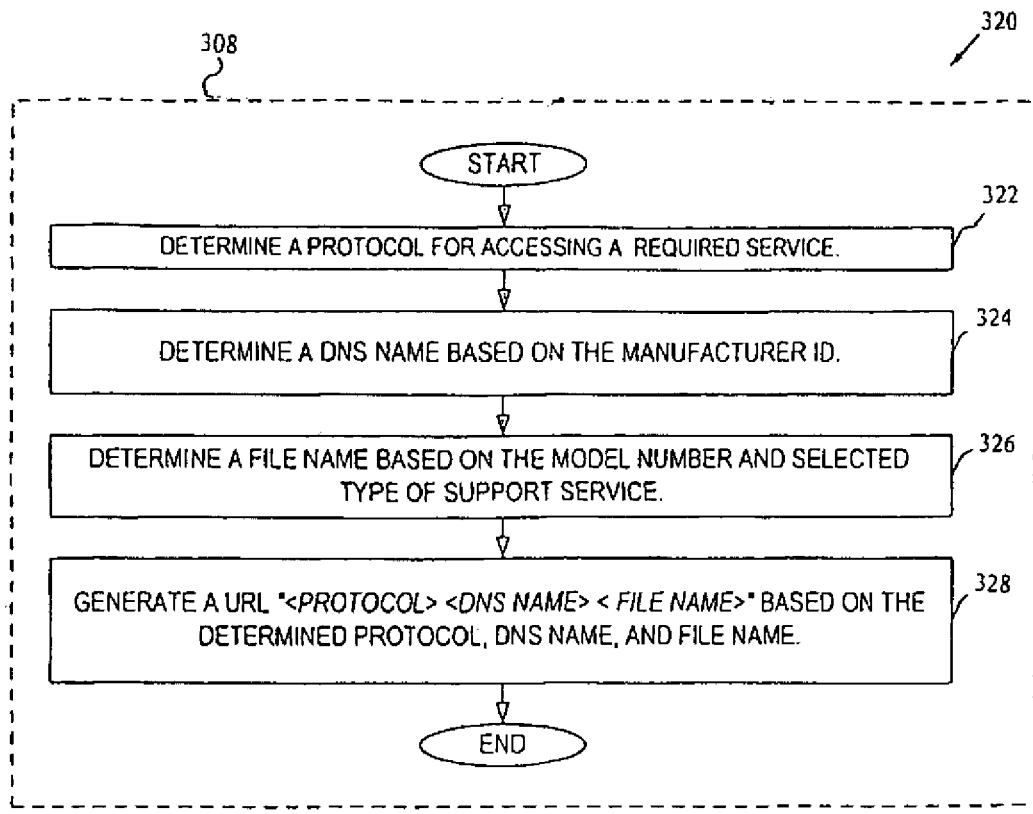
Figure 11:
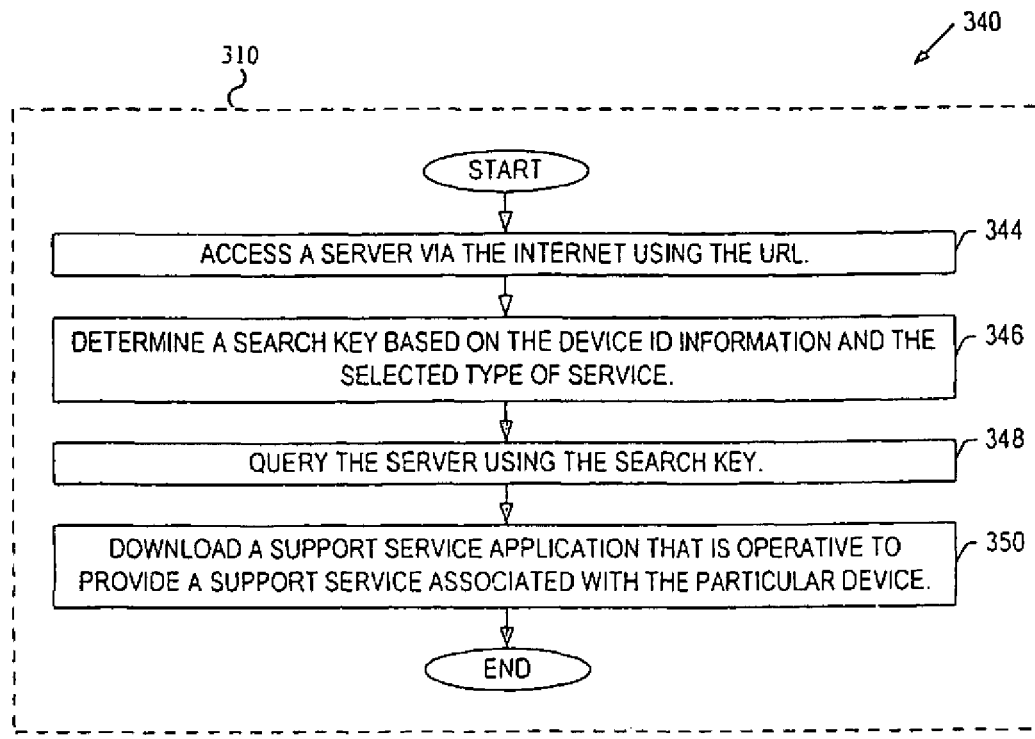

FIG. 3 is a block diagram generally illustrating software components of a service management system including: a plurality of modules having at least one home network bridge, a service manager, a resource manager, an Internet bridge, and at least one support service application associated with a device of the home network; and a platform for supporting the modules, and for dynamically loading and unloading the service applications;

FIG. 4 is a block diagram generally illustrating a main graphical user interface (GUI) screen provided by the service management system enabling a user to select from a list of devices in the user's home network configuration;

FIG. 5 is a block diagram generally illustrating a GUI screen provided by a control service application loaded by the management system for controlling a particular device, the screen including a service/help button for initiating support services for the device;

FIG. 6 is a block diagram generally illustrating a GUI screen displayed in response to selection of service/help button;

FIGS. 7 and 8 are block diagrams generally illustrating exemplary GUI screens provided by a support service application loaded by the service management system in order to provide interactive remote supports for a selected device in the home network system;

FIG. 9 is a flow diagram generally illustrating a process of identifying and accessing support service applications associated with home network devices, the process including a sub-process for forming a URL to be used in accessing a service application via the Internet, and a sub-process for accessing and downloading specified service applications;

FIG. 10 is a flow diagram illustrating an embodiment of the sub-process for forming a URL to be used in accessing a particular service application;

FIG. 11 is a flow diagram illustrating a particular embodiment of the sub-process of accessing and downloading a service application by querying a server;

FIG. 12 is a flow diagram generally illustrating an exemplary client-side support service process executed by the gateway device for providing a remote interactive support service for a selected device in a home network system; and FIG. 13 is a flow diagram generally illustrating an exemplary server-side support service process executed by a server for providing a remote interactive support service for a selected device in a home network system.

DETAILED DESCRIPTION OF THE PREFERRED EMBODIMENTS

Figure 1:
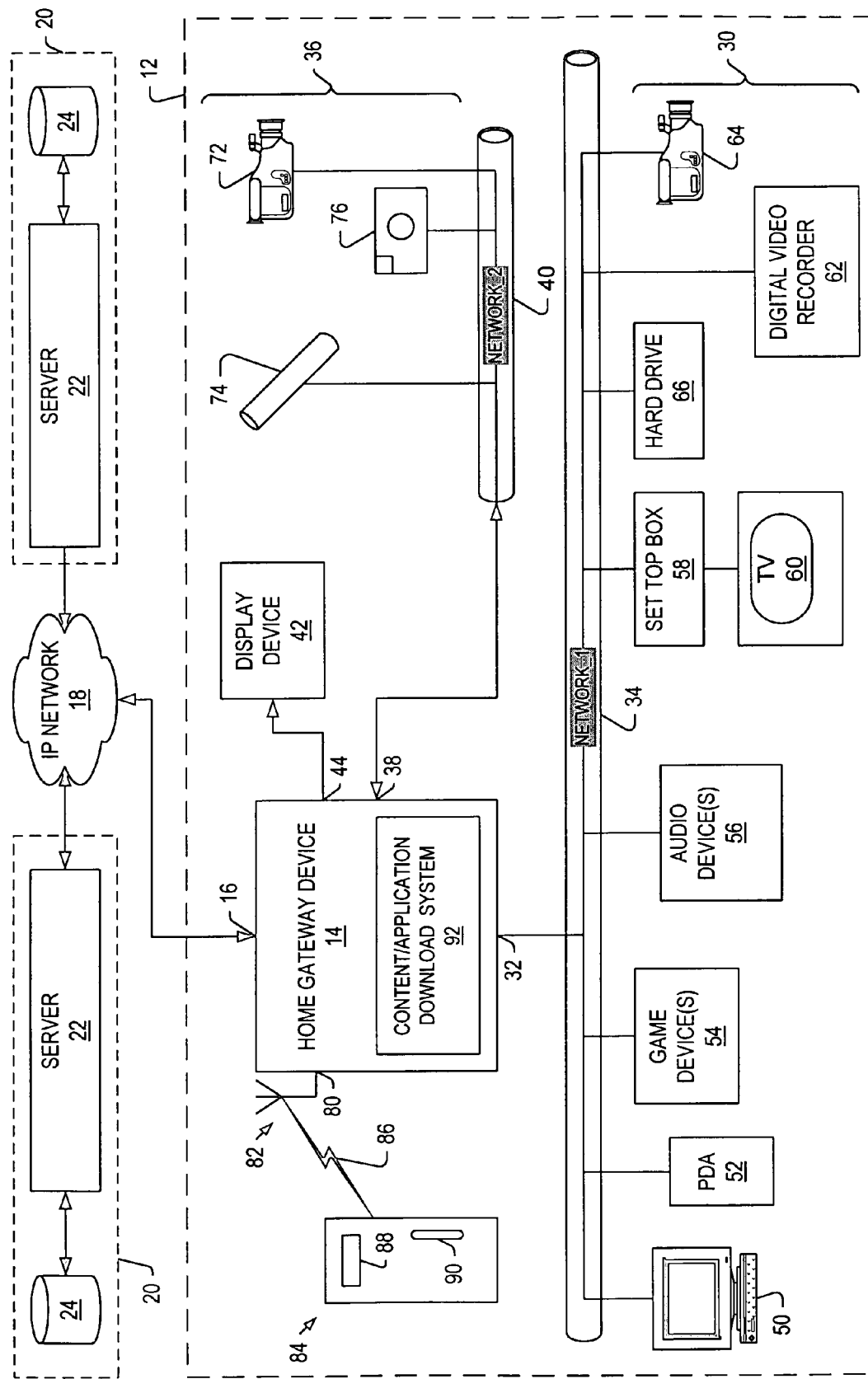
FIG. 1 is a block diagram generally illustrating a home network system including a plurality of electronic devices each being coupled with a residential gateway that is operative to access the Internet, and to provide a service management process in accordance with the present invention.

FIG. 1 shows a block diagram generally illustrating a home network system 12 including a gateway device 14 having a port 16 communicatively coupled with an internet protocol (IP) network 18 such as the Internet thereby enabling the gateway device 14 to access a plurality of different server sites including a remote maintenance server site 20 having a computer system 22 operative to access at least one associated database 24, and a remote manual server site 20 having a computer system 22 operative to access at least one associated database 24 as further explained below.

The home network system 12 also includes: a first group of electronic devices 30 communicatively coupled with a port 32 of the gateway device 14 via a first home network 34 designated NETWORK_1; a second group of electronic devices 36 communicatively coupled with a port 38 of the gateway device via a second home network 40 designated NETWORK_2; and a display device 42 communicatively coupled with port 44 of the gateway device. In accordance with the present invention, the first and second home networks 34 and 40 may be implemented using any technology that provides for a quality of service including reliable exchange of service application commands and timely delivery of multiple digital audio-video (AV) streams between each of the electronic devices 30 and 36 respectively, and between the gateway device 14 and the electronic devices 30 and 36 respectively. The display device 42 may be a television or any other type of display device such as a CRT or flat panel display.

In the described embodiment, NETWORK_1 is implemented in accordance with the Home Audio Video interoperability (HAVi) standard based on the digital IEEE-1394 serial interface standard which currently allows for each of the devices 30 and the gateway device 14 to send and receive service commands and streams of digital AV content at speeds up to 400 Mbps. The HAVi standard provides a home network architecture is open, scaleable, platform independent, and language neutral. Also in the described embodiment, NETWORK_2 is implemented in accordance with the universal serial bus (USB) communications standard which currently allows for each of the devices 36 and gateway device 14 to send and receive service commands and streams of digital AV content at speeds up to 12 Mbps. In an alternative embodiment, either of the networks 34 and 40 may be implemented in accordance with the Ethernet standard or any other connection providing adequate quality of service for commands and streams of digital AV content.

The first group of electronic devices 30, each of which is connected to the gateway device via NETWORK_1, include: a first personal computer (PC) system 50 having a system memory (not shown) for storing computer readable instructions, and a processor (not shown) for executing computer readable instructions; a personal digital assistant (PDA) 52; at least one game device 54 (e.g., Sony Play Station); audio devices 56 (e.g., a compact disk player, jukebox AV system, or mini-disc player) including speakers (not shown); a set top box 58 connected to a television (TV) 60 to provide the TV with satellite/cable television services; a digital video recorder 62 (e.g., a TIVO™ system) which may use a digital cable service; a camcorder 64; and a hard disk storage device 66 providing additional storage of media assets including digital video content (e.g., MPEG format video content). The second group electronic devices 36 includes a second personal computer 70, a camcorder 72, a Sony Music clip 74, and a digital camera 76 each being a connected to the gateway device via NETWORK_2. In the described embodiment, each of the devices 36 is a USB compatible device.

The home network system 12 provides interoperability of the networked electronic devices 30, 36. The networks 30 and 36 provide quality of service connection between networked devices in order to handle the exchange of both commands and multiple digital AV streams between the devices 30, 36 and the gateway device 14. The benefit of the network 12 of interoperable devices is that it enables sharing of device resources in order to accomplish sophisticated applications by providing seamless exchange of instructions and AV data between electronic devices in the home network.

In one embodiment, the network system 12 allows for configuring at least one of the devices (e.g., a personal computer system) to be a controlling device that is operative to provide for remotely controlling other electronic devices in the home network system. For example, a user may program a recording on a VCR following a menu generated by the TV on the TV screen. In accordance with the HAVi standard, there is no single controlling device. Any device in the network that has been designed to do so can control other devices.

In order for a controlling device to control a particular controlled device in a home network, the controlling device must be able to access a particular control application having executable code for controlling the particular controlled device. Some of the electronic devices in the home network may be provided with an internal ROM unit having stored thereon an associated control application for controlling the device. For these devices, the control application may be transmitted from the controlled device to the controlling device. Also, some of the electronic devices may be packaged and sold with a disk having an associated control application stored thereon. For these devices, the control application could be loaded to the controlling device from the disk. However, for other electronic devices, it may be that no compatible service application is available.

The gateway device 14 further includes a port 80 communicatively coupled with an electromagnetic detector 82 that is responsive to signals transmitted by a wireless remote control device 84 via a wireless link 86. In one embodiment wherein the wireless link 86 is a radio frequency (RF) link, each of the remote control device 84 and gateway device 14 includes an RF transceiver, and the detector 82 is an RF antenna. The wireless link 86 may also be an infrared (IR) link.

As further explained below, the gateway device 14 is operative to access, load, and execute a wide variety of different types of service applications providing home network services associated with each of the electronic devices 30, 36 in the home network system. Categories of home network support service applications include: remote manual support service applications for helping users to learn how to use associated devices; remote interactive diagnosis support service applications enabling a user to remotely and/or interactively diagnose problems with associated devices; and remote maintenance support service applications providing for the performance of remote maintenance functions on associated devices.

In one embodiment, remote support service applications executed by the gateway device 14 provide for displaying a graphical user interface (GUI) on the display device 42 enabling a user to initiate and control the performance of the supports associated with electronic devices in the network.

As an example, a particular remote manual service application associated with the camcorder 64 may be executed by the gateway device 14 to provide a GUI enabling a user to learn how to use various features of the camcorder 64.

In another embodiment that does not require a graphical user interface, the remote control device 84 includes: a display unit 88; and a select button 90 for receiving user input. In this embodiment, the remote control device is operative to display indicia of possible actions on the display device 88, and the select button 90 is responsive to user input indicative of a selected one of the possible actions.

Note that each of the devices may require a different support service application which may be determined based on the vendor, model number, and serial number of the device as further explained below. Some of the electronic devices 30 and 36 may be provided with an internal ROM unit having stored thereon an associated service application. For these devices, the service application may be transmitted from the device to the gateway and executed by the gateway as further explained below. Also, some of the electronic devices may be packaged and sold with a disk having an associated service application stored thereon. For these devices, the service application could be loaded to the gateway from the disk. However, for other electronic devices, it may be that no compatible service application is available on the local home network. As further explained below, the gateway device 14 is operative to download service applications associated with selected devices via the Internet.

The gateway device 14 provides the home network system 12 with access to a wide variety of different types of useful service applications that are available via the IP network 18. The gateway device includes a processor (shown in FIG. 2 and described below) for executing a home network device service management system 92 in accordance with the present invention. As further explained below, execution of the system 92 provides service management functions including: communicating with the devices 30, 36 of the network system 12 to identify particular service applications that are compatible with selected ones of the devices; accessing and downloading service applications from remote servers via the Internet if required; providing a centralized graphical user interface on the display device 42 enabling a user of the home network system to select from a plurality of service applications for performing services associated with corresponding ones of the devices; and executing a selected service application.

In one embodiment, the gateway device 14 provides a GUI service selection menu on the display device 42 enabling a user to select a particular device and an associated service application to be executed for providing a service associated with the particular device. Also in an embodiment, the wireless remote control device 84 may be used to interact with the service selection menu by providing user input indicative of a selected one of the devices and associated services.

In the described embodiment, the service management system 92 is executed by the gateway device 14. However, in an alternative embodiment, a personal computer could be configured to provide the gateway device by being configured to access the Internet, and to execute the service management system 92. Note that in accordance with the HAVi architecture, all of the electronic devices 30 may control functions performed by other ones of the electronic devices 30 if configured to do so. Therefore, in accordance with the present invention, any of the electronic devices 30 could be configured to provide the gateway device.

Figure 2:
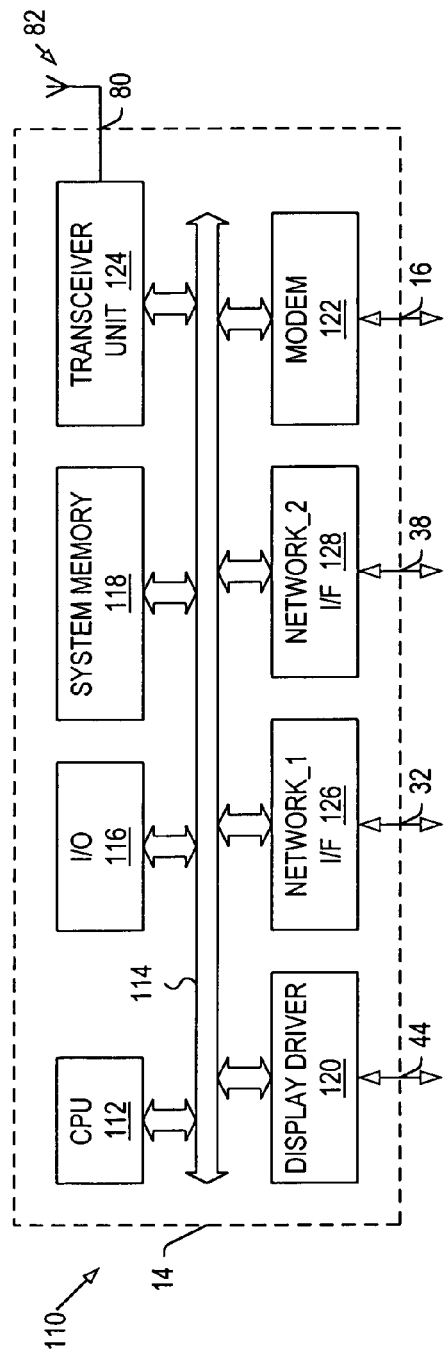
FIG. 2 is a block diagram generally illustrating hardware components of the gateway device of FIG. 1.

FIG. 2 shows a generalized block diagram illustrating components at 110 of the gateway device 14 (FIG. 1) in accordance with the present invention. The gateway device 14 generally includes: a central processing unit (CPU) 112 communicatively coupled with a system bus 114; an input/output unit 116 such as a keyboard and mouse coupled with the CPU via the system bus; a system memory unit 118 (including both volatile and non-volatile memory units) for storing computer readable instructions including instructions of the service management system 92 (FIG. 1), and being coupled with the CPU via the system bus; a display driver unit 120 for providing display data to the display device 42 (FIG. 1) via port 44 of the gateway device, and being coupled with the system bus; a modem 122 for connection with the IP network 18 (FIG. 1) via port 16 of the gateway device, and also being connected to the system bus; a transceiver unit 124 connected to the electromagnetic detector 82 via port 80, and also being connected to the system bus; a first home network interface 126 for connection with NETWORK_1 (FIG. 1) via port 32 of the gateway device, and also being connected to the system bus; and a second home network interface 128 for connection with NETWORK_2 via port 38 of the gateway device, and also being connected to the system bus.

As mentioned above, in the described embodiment, the transceiver unit 124 is an RF transceiver. As is well understood, the modem 122 may be implemented by a cable modem allowing for Internet access via cable television service, a DSL modem allowing for Internet access via plain old telephone service (POTS), or a wireless IP interface such as a Bluetooth™ wireless technology connection. In the described embodiment, the first network interface 126 is an IEEE 1394 interface, and the second network interface 128 is a USB interface.

FIG. 3 shows a block diagram generally illustrating software components of the service management system 92 that is executed by the gateway device 14 (FIG. 1) in accordance with the described embodiment of present invention. As mentioned, the system 92 may also be executed by a personal computer system configured to access the Internet. The service management system 92 includes a plurality of modules having: a first home network bridge 154 providing an interface for communicating with each of the first group of devices 30 (FIG. 1) via NETWORK_; a second home network bridge 158 providing an interface for communicating with each of the second group of devices 36 (FIG. 1) via NETWORK_2; an Internet network bridge 162 providing an interface for accessing Internet services via the IP network 18 (FIG. 1); a service manager 166 providing service management functions as further explained below; a resource management unit 168 for managing the limited resources of the gateway device including the system memory unit 118 and CPU 112 (FIG. 2), and resources of the display device 42 (FIG. 1); and a plurality of service applications 170 designated SERVICE_1, SERVICE_2, . . . , SERVICE_N each being operative to provide an associated service to at least one of the electronic devices of the home network system.

The system 92 also includes a platform 172 for supporting and providing communication between each of the modules 154, 158, 162, 166, 168, and 170. The platform 172 is also operative to dynamically load and unload the service applications 170 under control of the service manager 166. The service manager 166 is operative to communicate with each of the devices 30, 36 (FIG. 1) of the home network system via the platform 172 and the bridges 154 and 158, and is also operative to communicate with server sites accessed via the Internet bridge 152 for the purpose of downloading required service applications 170 as further explained below.

In one embodiment, the platform 172 includes a Java virtual machine, and each of the service applications 170 is an application bundle that may be interpretively executed by the Java virtual machine. In an alternative embodiment wherein the platform 172 is a Java virtual machine, each of the service applications 170 may be an applet, or a Havlet which is a HAVi Java application defined in accordance with the HAVi standard. In one embodiment, each of the service applications 170 is downloaded from a server via the IP network under control of the service manager 166, and stored in volatile memory of the gateway device. In another embodiment, each of the service applications 170 may be downloaded and stored in the gateway device memory 118 (FIG. 2) for later use.

Service management functions provided by the management unit 166 include: communicating with each of the electronic devices of the home network system via the home network bridges 154 and 158 in order to generate service identifiers required for accessing service applications for servicing particular devices; accessing service applications from remote servers via the Internet 18 (FIG. 1) in response to messages received from the devices and/or user input as further explained below; generating a mapping between the electronic devices and service applications 170; providing a GUI service selection menu on the display device enabling a user to select a service application for providing a specified service associated with a particular one of the devices of the home network system; and dynamically loading and unloading selected ones of the service applications 170 to initiate the performance of services associated with the selected devices.

As mentioned above, each of the service applications 170 includes computer readable and executable instructions for providing a particular service associated with a particular one (or a particular set) of the electronic devices of the home network system. A plurality of service applications 170 may be stored in the system memory unit 118 (FIG. 2). As mentioned, service applications needed for providing specific services for associated devices may or may not be available in the system memory unit. When a new device is connected to the home network system 12 (FIG. 1) by connecting it to one of the first and second home networks 34 and 40 (FIG. 1), the new device is detected by the associated one of the home network bridges 154 and 158 in accordance with a process further explained below. Device ID information indicative of the vendor, model number, and serial number of the new device is determined by the associated network bridge and provided to the service manager 166 which is operative to determine whether any service applications 170 that are compatible with the new device are stored in the system memory unit 118. If not, the service manager 166 accesses a server via the Internet to download a service application compatible with the new device.

FIG. 4 shows a block diagram generally illustrating a main graphical user interface (GUI) screen at 200 of the service management system 92 (FIG. 3) enabling a user to select from a list of devices in the user's home network configuration. The main GUI screen 200 includes a plurality of device indicia 202 each indicating one of the devices 30, 36 (FIG. 1) of the home network system. For each of the device indicia 202, the main GUI screen also includes an associated service button that is either a service registration button 204 or a service initiation button 206. Upon discovery of a new device in the home network system by one of the home network bridges 154 and 158 (FIG. 3), the service manager 166 adds an indicia 202 of the new device to the main GUI screen, and provides an associated service registration button 204 for initiating a registration process. After a new device has been registered in accordance with the registration process as further explained below, the service management system displays a service initiation button 206 proximate the indicia 202 of the new device enabling the user to initiate remote interactive services associated with the new device as further explained below.

The registration process, initiated in response to activation of one of the registration buttons 204 associated with a new device, includes the steps of: receiving device ID information (e.g., vendor ID number, model number, and serial number) indicative of the new device; forming a uniform resource locator (URL) based on the device ID information; accessing at least one server via the Internet using the URL; and receiving information indicative of service applications 170 (FIG. 3) available at the server(s) that are operative to provide services associated with the new device, and which may be downloaded from the server and loaded on to the platform 172 of the service management system.

The information indicative of each associated service application available at the server(s) for the associated device includes: information indicative of the type of service application (e.g., a remote control service application for remotely controlling the device, remote interactive manual process for instructing the user regarding operation of the device, a remote interactive maintenance process for instructing the user in solving maintenance problems associated with the device, or a remote interactive diagnostic process); and a URL for accessing the associated service application.

In response to activation by the user of one of the service initiation buttons 206 associated with a selected device, the service management system initiates a process of identifying and accessing service applications associated with the selected devices in accordance with the present invention as further explained below. In the described embodiment, the service management system accesses and loads a remote control service application 170 (FIG. 3) onto the platform, and initiates a remote control service for controlling the associated device.

FIG. 5 shows a block diagram generally illustrating an exemplary remote control service GUI screen at 210 provided by a control service application 170 (FIG. 3) that is loaded by the service manager 166, and executed by the gateway device in response to activation by the user of one of the service initiation buttons 206 (FIG. 4) associated with a selected device. The depicted GUI screen 210 provides for controlling the camcorder 64 (FIG. 1) and includes: a display area 212 for displaying image data captured by the camcorder, and transmitted to the gateway device 14 (FIG. 1) via the home network; a play button 214 which, when activated, causes the service manager 166 (FIG. 3) to generate a play command that is transmitted to the camcorder via the home network bridge, for instructing the camcorder to play; play, pause and stop buttons 214, 216, and 218 which, when activated, cause the service manager 166 (FIG. 3) to generate play, pause, and stop commands that are transmitted to the camcorder via the home network bridge, for instructing the camcorder to play, pause, and stop respectively; and a service/help button 220 which, when activated, causes the service manager 166 to access information indicative of each associated service application 170 (FIG. 3) known to be available at specified server(s) for the camcorder.

FIG. 6 shows a block diagram generally illustrating an exemplary support service application GUI screen at 230 that is displayed by the service management system 92 (FIG. 1) on the display device 42 (FIG. 1) in response to activation by the user of the service/help button 220 (FIG. 5). The GUI screen 230 includes: a button 232 for initiating a remote interactive manual process for instructing the user regarding operation of the camcorder; a button 234 for initiating a remote interactive maintenance process for instructing the user in solving maintenance problems associated with the device; a button 236 for initiating a remote interactive diagnostic process for automatically diagnosing problems with the associated device; and a button 238 for initiating an integrated application process that provides for controlling the associated device and another selected one of the devices (e.g., a video editing process that utilizes and combines the functions of the camcorder 64 and digital video recorder 62 of FIG. 1).

FIG. 7 shows a block diagram generally illustrating a first exemplary support GUI screen at 240 provided by an interactive support service application 170 (FIG. 3) loaded by the service management system 92 in order to provide interactive remote supports for the camcorder 64 (FIG. 1). As further explained below, a support service process provided by the loaded application may include the steps of: communicating with the particular device via the home network in order to determine a current functional state of the particular device; determining diagnostic information based on the current functional state of the device, the diagnostic information indicating a problem or other information associated with operation of the device; and determining user instructional information based on the current functional state of the device and/or the diagnostic information.

The GUI screen 240 includes: a display area 242 for displaying functional state information indicative of the current functional state of the camcorder, and diagnostic information indicative of indicating problems with the camcorder as further explained below; a continue button 244 enabling the user to continue to another support GUI screen; and a device browser button 246. In the depicted example, the display area 242 includes displayed therein: functional state information in the form of text indicating that a "memory stick" of the camcorder is locked, and diagnostic information in the form of text indicating that the locked memory stick prevents the user from taking pictures using the camcorder.

FIG. 8 shows a block diagram generally illustrating a second exemplary GUI screen at 250 provided by the support service application associated with the camcorder. The GUI screen 250 includes: a display area 252 for displaying user instructional information for instructing the user how to unlock the memory sick of the camcorder; a continue button 256 enabling the user to continue to another support GUI screen; and a device browser button 258 for initiating a help directory enabling the user to select from a list of help topics associated with the device. In the depicted example, the display area 252 includes text describing how to solve the problem of the locked memory stick, and a graphical image at 254 of the camcorder with an arrow indicating the position of a button on the camcorder that may be pressed in order to unlock the memory stick. In an embodiment of the present invention, the interactive support service application automatically provides for detecting when the user has pressed the specified button on the camcorder, and continues through the support service process accordingly. The application may also provide for detecting if the user presses a wrong button.

In accordance with the present invention, each of the support service applications 170 (FIG. 3) may include instructions and data (e.g., text, and graphical images) for providing any type of interactive support for any type of consumer electronics device. In an embodiment, the support service applications are operative to access service data including text and graphical image data by accessing selected Web pages. The service data may include educational information for a manual service, and remedial instructions for a maintenance or diagnostic service.

FIG. 9 shows a flow diagram generally illustrating a process at 300 of identifying and accessing service applications associated with electronic devices 30, 36 (FIG. 1) of the home network system in accordance with the present invention. In one embodiment, the process 300 is implemented as computer readable instructions comprising the service management system 92 (FIG. 3) which is executed by the gateway device. In an alternative embodiment, the process 300 may be performed by configuring either of the personal computer systems 50, 70 (FIG. 1) to access the Internet and control the home network devices 30 and 36 (FIG. 1) respectively.

The process 300 begins with a step 302 in which the gateway device receives device ID information associated with each of the devices 30, 36 (FIG. 1) in the home network system 12. In one embodiment, the device ID information received from each particular device includes an associated vendor ID indicative of the vendor of the particular device, a model number indicative of the model of the particular device, and a serial number of the particular device. In one embodiment, devices connected to the IEEE 1394-based NETWORK_1 have parameters stored in an IEEE 1212 ROM for uniquely identifying the device by vendor ID, model number, and a serial number. For example, the camcorder 64 (FIG. 1) may be a Sony camcorder, model number CCD-TRV87. In the described embodiment, step 302 is executed by the home network bridges 154 and 158 (FIG. 3) which communicate with the devices of the first and second groups of devices 30 and 36 (FIG. 1) respectively to receive the device ID information. In an embodiment, the first home network bridge 154 (FIG. 3) is operative to receive device ID information from the electronic devices 30 (FIG. 1) in accordance with the HAVi standard.

In step 304, the service management system determines a particular one of the devices in the home network system for which a service application is required. In one embodiment, the determination in step 304 includes: discovery of a new device in the home network system by one of the home network bridges 154 and 158 (FIG. 3); and a determination that no service application compatible with the new device is locally available (e.g., stored in the system memory unit of the gateway device). In another embodiment, the step 304 of determining a particular device requiring a service application includes a step 306 of receiving user input indicating that a selected type of services is required by a selected one of the devices. In a further embodiment, the step 304 includes a step of determining whether a revised service application is available for a specific device. As an example, the serial number of a particular device received in step 302 may indicate that the particular device requires an updated service application.

In step 308, the service manager 166 (FIG. 3) receives the device ID information associated with a particular device via the associated one of the home network bridges, and forms a uniform resource locator (URL) based on the device ID information. The URL formed in step 308 is used to access a Web server or FTP server site via the IP network 18 (FIG. 1) for the purpose of determining and downloading a service application that is compatible with the particular device as further explained below.

A URL is a locator which identifies a specified file at a specified server. A URL usually includes three parts: a protocol (e.g., http, ftp, file, news, gopher, mailto, and telnet); a host name such as a domain name system (DNS) name of the machine on which the page is located (e.g. Sony.com); and a file path, such as a file name, specifying a particular file. A common URL format is expressed in accordance with Expression (1), below.

<PROTOCOL>*<DNS NAME>*<FILE NAME>     (1)

wherein certain punctuation designated as "*" separates the three different parts of the URL.

As further explained below, the URL may be formed in accordance with several different embodiments of the present invention. In one embodiment, the URL identifies a server which may be queried for a service application associated with a particular electronic device as further explained below. In another embodiment, the URL identifies a particular file at a particular server from which a particular service from which a particular service application may be downloaded without presenting any query to the server as further explained below. In step 310, the service manager 166 (FIG. 3) downloads a service application that is operative to provide a service associated with a particular one of the devices of the home network.

FIG. 10 shows a flow diagram illustrating a sub-process at for implementing the step 308 (FIG. 9) of forming a URL in accordance with one embodiment of the present invention wherein a URL is formed to identify a particular file at a particular server from which a particular service application may be downloaded without the need to present a query to the server. The sub-process 320 is implemented as computer readable instructions of the service management system 92 (FIG. 3) which is executed by the gateway device 14 (FIG. 1).

The process begins with a step 322 in which the service manager 166 (FIG. 3) determines a protocol for accessing a service associated with the particular device identified in step 302 (FIG. 4). In an embodiment of step 322, the service manager references a protocol table that provides a mapping between protocols and device ID information in order to determine an appropriate protocol to be used for accessing a service application for the particular device. For example, if the device ID information indicates Sony Corporation as the vendor, and the protocol table indicates that a server known to provide service applications for Sony devices is an a file transfer protocol (FTP) server, then the determined protocol is FTP.

In step 324, the service manager determines a DNS name based on the vendor ID associated with the particular device. In an embodiment of step 324, the service manager references a DNS name table that provides a mapping between DNS names and device ID information in order to determine an appropriate DNS name to be used for accessing a service application for a particular device. As an example, if the vendor ID indicates Sony Corporation, and the DNS name table indicates "Sony" as a DNS name identifying a server known to provide service applications for Sony devices, then the DNS name determined in step 324 is "Sony".

In step 326, the service manager determines a file name based on the model number of the particular device. In an embodiment of step 326, the service manager references a file name table that provides a mapping between file names and device ID information in order to determine an appropriate file name to be used for accessing a service application for a particular device. In the example wherein the device ID information indicates the Sony model CCD-TRV87 camcorder, the file name table may indicate "CCD-TRV87" (or any other file name mapped to "CCD-TRV87") as the file name for accessing a service compatible with the Sony model CCD-TRV87 camcorder at a server. In an alternative embodiment, the file name is determined based on the model number and serial number of the particular device. This embodiment provides for service applications that are specific to device serial number ranges. For example, devices having serial numbers in a range between 0 and one million may require a first service application, and devices having serial numbers in a range between one million and two million may require a second service application.

In step 328, the service manager forms a URL based on the protocol, DNS name, and file name determined in steps 322, 324, and 326 respectively. The URL may be formed in accordance with Expression (1), above.

FIG. 11 shows a flow diagram for implementing the step 310 (FIG. 9) of downloading a service application in accordance with the embodiment of the present invention wherein the URL formed in step 308 (FIG. 4) identifies a server which may be queried for a service application associated with a particular electronic device.

The sub-process 340 begins with a step 344 in which the service manager 166 (FIG. 3) accesses a specified server via the Internet bridge 162 (FIG. 3) using the URL formed in step 308 (FIG. 9). In one embodiment, the URL identifies a server associated with a specified vendor (e.g., Sony) which may be queried using a search term determined based on a model number (e.g., "CCD-TRV87") for a service application associated with a device manufactured by the specified vendor. In another embodiment, the URL identifies a server associated with a group of vendors, the server being responsive to queries for a file providing a service application associated with a device manufactured by a particular one of the group of vendors.

In step 346, the service manager determines a search key based on the device ID information associated with the particular device. In the embodiment wherein the URL identifies a server associated with a specified vendor (e.g., Sony), the search term is determined based on the model number (e.g., "CCD-TRV87") of the particular device. In the embodiment, wherein the URL identifies a server associated with a group of vendors, the search term is determined based on the vendor ID, and model number of the particular device (e.g., "Sony" and "CCD-TRV87").

In step 348, the service manager queries the server using the search key determined in step 346. The server is responsive to the query, and operative to determine a file providing a service application associated with the particular device if one is available in an associated database 24 (FIG. 1). In one embodiment, the query is passed to the server using a common gateway interface (CGI) standard method wherein an executable CGI script (or program) is identified by the URL described above, the script providing an interface between the server and a database having service applications stored therein.

In step 350, the service manager downloads from the specified server a service application that is operative to provide a particular service associated with the particular device. In one embodiment wherein the platform 152 (FIG. 3) is a Java virtual machine, and each of the service applications 170 is a bundle application, the step 350 of downloading a service application includes immediately executing the application interpretively. In another embodiment, the step 350 of downloading the service application 170 includes storing the application in the gateway device memory 118 (FIG. 2) for future use.

FIG. 12 shows a flow diagram generally illustrating an exemplary client-side support service process at 400 for providing a remote interactive support for a selected device in a home network system in accordance with the present invention. In the described embodiment, the process 400 is implemented by the support service management system 92 (FIG. 3) which loads an appropriate support service application 170 (FIG. 3) onto the platform 172 as described above.

The process 400 begins with a step 402 in which the system communicates with the selected consumer electronic device via the associated home network 34, 40 (FIG. 1) in order to determine a current functional state of the device. In the camcorder service example, the support service management system 92 (FIG. 3) communicates with the camcorder via NETWORK_1 (e.g., by sending a request message to the camcorder requesting parameters indicating the current functional state of the camcorder), and the camcorder sends back a message carrying parameters indicating the current functional state of the camcorder (e.g., parameters indicating that the memory stick is locked as described above).

In step 404, the service management system determines information (e.g., text and graphics) for indicating the functional state of the particular device. In one embodiment, step 404 includes sub-steps of: providing information indicative of the current functional state of the device to the server computing system for the purpose of accessing a selected document based on the current functional state; and downloading a document (e.g., a Web page) from the server computing system, the document providing instructional information about the selected device taking into account the current functional state of the selected device. In the above described camcorder service process example, the information displayed at 242 of the GUI screen 240 (FIG. 7) may be accessed from the server computing system using the current functional state of the camcorder. In step 406, the system displays information indicating the current functional state of the particular device on the display device 42 (FIG. 1). In the camcorder example, the support service application determines functional state information indicating that the memory stick is locked, and displays this information at 242 on the GUI screen 240 (FIG. 7).

From step 406, the process proceeds to 408 in which the system determines diagnostic information based on the current functional state of the particular device, the diagnostic information indicating a problem with the particular device. In one embodiment of the support service process, the diagnostic information may be ascertained based only on the current functional state of the selected device. In the camcorder example, the diagnostic information may be determined based only on the functional state information indicating that the memory stick is locked. In another embodiment, the diagnostic information may be ascertained based on the current functional state of the selected device, and also based on user input. For the camcorder example in this embodiment, the diagnostic information may be ascertained based on the functional state information indicating that the memory stick is locked, and also based on previously provided user input selecting the play button 214 (FIG. 5). In yet another embodiment, the diagnostic information may be ascertained based on the current functional state of the selected device, and also based on user input in the form of a help query entered by the user via a list of help topics. Note that the diagnostic information may be based on a determination that the device has failed in which case the diagnostic information may instruct the user to bring the device to a vendor service center.

In step 410, the support service application transmits the diagnostic information to a server computing system via the Internet, and the server computing system creates and stores a record of the problem with the associated device as further explained below. In step 412, the support service application displays the diagnostic information on the display device. In the camcorder example, the systems displays the diagnostic information at 242 on the GUI screen 240 (FIG. 7).

In step 414, the system determines user instructional information based on the current functional state of the particular device and/or the diagnostic information determined in step 408. The instructional information provides instructions to the user for operating the particular device and/or solving problems associated with the particular device. In one embodiment, the system transmits the functional state information back to the server computing system which is operative to determine a document (e.g., a Web page) based on the functional state information, and to transmit the document back to the gateway device. The document includes user instructional information for operating the particular device, or solving a problem therewith. In the camcorder example, the user instructional information displayed at 252 on the GUI screen 250 (FIG. 8) is provided via a document accessed from the server computing system. In step 416, the system displays the user instructional information on the display unit 42 (FIG. 1). In the camcorder example, the system displays the user instructional information at 252 on the GUI screen 250 (FIG. 8).

From step 416, the process proceeds to 418 at which it is determined whether a help menu has been accessed. The help menu enables a user of the gateway device to select from a list of help topics associated with operation of the selected device. In the above described camcorder embodiment, a help menu may be accessed by activating the browser button 246 (FIG. 7). If the help menu has been accessed, then the process proceeds to step 420 in which the system displays a list of help topics. In one embodiment, the help menu may be provided via a help menu document (e.g., a Web page) accessed by the system from the server computing system in response to the user activating the browser button. The help menu document may include data comprising a list of help topics, and embedded instructions for receiving user input and providing a user selected topic back to the server computing system. In step 422, the system receives user input indicating a selected help topic. In step 424, the system determines help information based on the selected help topic. In one embodiment, the system provides information indicative of the selected help topic to the server computing system; and downloads a document from the server computing system, the document providing information associated with the selected device for the selected help topic. In step 426, the help information is displayed.

FIG. 13 shows a flow diagram generally illustrating an exemplary server-side support service process at 450 that is executed by a server computing system 21, 24 (FIG. 1) in conjunction with execution of the client-side support service process 400 (FIG. 12) at the gateway device of a client for providing a remote interactive support for a selected device in a home network system. In step 452, the system receives search key information from the client, the search key information specifying device ID information associated with a selected device in a home network system, and information indicative of a selected type of service. In step 454, the server computing system determines a support service application of the selected type for the selected device based on the search key information. In one embodiment, the server computing system includes an expert system.

In step 456, the system transmits the determined support service application to the client. In step 458, the server computing system receives functional state information and/or diagnostic information and/or help query information associated with the particular device from the client.

In step 460, the system accesses a selected document (e.g., a Web page) based on the information received in step 458, the selected document including support service information for operating the selected device, and/or solving a problem with the selected device. In the camcorder example, the user instructional information that is displayed at 252 on the GUI screen 250 (FIG. 8) is provide via a document accessed from the server computing system.

In step 462, the system transmits the selected document to the client. In step 464, the system generates a database record based on the received functional state information and/or diagnostic information and/or help query information associated with the particular device. In step 466, the server computing system stores the database record in a database.

As described above, the service management application of the present invention provides for automatically identifying support service applications associated with electronic devices based on device ID information, accessing support service applications via the Internet, dynamically loading the support service applications, and executing the support service applications to provide remote interactive support services for selected devices in the home network system.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

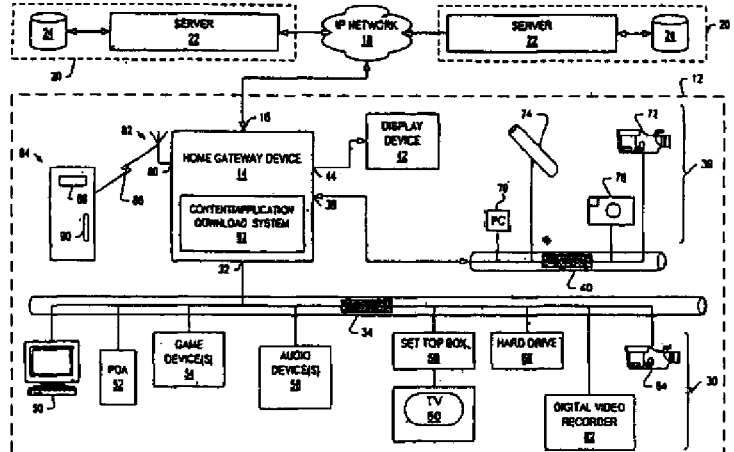

What is claimed is:

1. A process of identifying and managing interactive support service applications associated with consumer electronic devices, the process for execution by a gateway device communicatively coupled with each of the electronic devices via a home network, the gateway device being operative to access the Internet and being communicatively coupled with a display unit, comprising:

initiating a remote interactive diagnostic process at the gateway device, for automatically diagnosing problems with a selected one of the electronic devices, the remote interactive diagnostic process comprising:

determining device identification information associated with the selected one of the electronic devices for which a support service application is required;

providing said device identification information to a selected server computing system via the Internet;

downloading an interactive support service application associated with said selected device from the selected server computing system; and executing said downloaded interactive support service application at the gateway device to provide a remote interactive support service process for said selected device, wherein said interactive support service application comprises a diagnostic application including instructions executable by said gateway device to determine a current functional state of said selected device and determine diagnostic information based on said current functional state of said selected device, said diagnostic information indicating a problem associated with said selected device.

2. The process of identifying and managing interactive support service applications as recited in claim 1 wherein said interactive support service process comprises a remote interactive manual providing educational instructions to a home network system user regarding operation of said selected device.

3. The process of identifying and managing interactive support service applications as recited in claim 1 wherein said interactive support service process comprises a remote interactive maintenance process for instructing a home network system user in solving maintenance problems associated with said selected device.

4. The process of identifying and managing interactive support service applications as recited in claim 1 wherein said diagnostic application comprises a remote interactive diagnostic process comprising:

communicating with said selected device via said home network in order to determine said current functional state of said selected device; and displaying information indicative of said current functional state of said selected device on the display unit.

5. The process of identifying and managing interactive support service applications as recited in claim 4 wherein said diagnostic process further comprises:

displaying said diagnostic information on the display unit.

6. The process of identifying and managing interactive support service applications as recited in claim 5 wherein said diagnostic process further comprises:

transmitting said diagnostic information to the server computing system for the purpose of creating a database record based on said diagnostic information and said associated device identification information.

7. The process of identifying and managing interactive support service applications as recited in claim 4 wherein said diagnostic process further comprises:

determining user instructional information based on said current functional state of said selected device, said instructional information for providing instructions to the user for operating said selected device; and displaying said user instructional information on the display unit.

8. The process of identifying and managing interactive support service applications as recited in claim 5 wherein said diagnostic process further comprises:

determining user instructional information based on said diagnostic information, said instructional information for providing instructions to the user for solving said problem associated with said selected device; and displaying said user instructional information on the display unit.

9. The process of identifying and managing interactive support service applications as recited in claim 1 wherein providing said device identification information to a selected server computing system comprises:

forming a uniform resource locator based on said device identification information; and accessing said selected server via the Internet using said uniform resource locator.

10. The process of identifying and managing interactive support service applications as recited in claim 9 wherein said device identification information includes associated vendor information indicative of a vendor of the selected device, and model information indicative of the model of the selected device.

11. The process of identifying and managing interactive support service applications as recited in claim 10 wherein forming a uniform resource locator comprises:
   determining a host name based on said vendor information;
   determining a file path based on said model information; and
   forming the uniform resource locator based on said host name and said file path.

12. The process of identifying and managing interactive support service applications as recited in claim 10 wherein forming a uniform resource locator comprises:
   determining a host name based on said vendor information; and
   forming the uniform resource locator based at least in part on said host name.

13. The process of identifying and managing interactive support service applications as recited in claim 1 wherein said interactive support service process further comprises:
   generating and displaying a help menu enabling a user of the gateway device to select from a list of help topics associated with operation of the selected device;
   receiving user input indicative of a selected help topic;
   providing information indicative of said selected help topic to the server computing system; and
   downloading a document from the server computing system, said document providing information associated with said selected device under said selected help topic.

14. The process of identifying and managing interactive support service applications as recited in claim 4 wherein said interactive support service process further comprises:
   providing information indicative of said current functional state to the server computing system for the purpose of accessing a selected document based on said current functional state; and
   downloading a document from the server computing system, said document providing instructional information about the selected device taking into account said current functional state.

15. The process of identifying and managing interactive support service applications as recited in claim 5 wherein said remote interactive support service process further comprises:
   providing said diagnostic information to the server computing system for the purpose of accessing a selected document based on said problem associated with said selected device; and
   downloading a document from the server computing system, said document providing instructional information for solving said problem associated with said selected device.

16. A service management software system for execution by a gateway device communicatively coupled with at least one electronic device via a home network, the software system for identifying and managing interactive support service applications associated with each of the electronic devices, the gateway device being operative to access the Internet, comprising:
   an input for initiating a remote interactive diagnostic process for automatically diagnosing problems with a selected one of the electronic devices;
   a home network bridge supported by a platform for receiving device identification information associated with the selected one of the electronic devices for which a service application is required;
   a service manager supported by the platform and being operative to form a uniform resource locator based at least in part on said device identification information; and
   an internet bridge supported by the platform and being responsive to receive said uniform resource locator from said service manager via the platform, and being operative to access a selected server computing system via the Internet using said uniform resource locator, and to download an interactive support service application associated with said selected device, wherein the platform is operative to dynamically load and unload support service applications and further wherein said interactive support application comprises a diagnostic application including instructions executable by said gateway device to determine a current functional state of said selected device and determine diagnostic information based on said current functional state of said selected device, said diagnostic information indicating a problem associated with said selected device.

17. The service management software system as recited in claim 16 wherein said device identification information includes associated vendor information indicative of a vendor of the selected device, and model information indicative of the model of the selected device.

18. The service management software system as recited in claim 17 wherein said service manager is operative to form said uniform resource locator by:
   determining a host name based on said vendor information;
   determining a file path based on said model information; and
   forming the uniform resource locator based on said host name and said file path.

19. The service management software system as recited in claim 17 wherein said interactive support service application is operative to implement a remote interactive manual process for providing educational instructions to the user regarding operation of said selected device.

20. The service management software system as recited in claim 17 wherein said interactive support service application is operative to implement a remote interactive maintenance process for instructing the user in solving maintenance problems associated with said selected device.

21. The service management software system as recited in claim 17 wherein said diagnostic support service application is operative to implement a remote interactive support service process comprising:
   communicating with said selected device via said home network in order to determine said current functional state of said selected device; and
   displaying information indicative of said current functional state of said selected device on the display unit.

22. The service management software system as recited in claim 20 wherein said interactive support service process further comprises:
   displaying said diagnostic information on the display unit.

23. The service management software system as recited in claim 22 wherein said interactive support service application further comprises:

transmitting said diagnostic information to the server computing system for the purpose of creating a database record based on said diagnostic information and said associated device identification information.

24. The service management software system as recited in claim 21 wherein said interactive support service application further comprises:
determining user instructional information based on said current functional state of said selected device, said instructional information for providing instructions to the user for operating said selected device; and
displaying said user instructional information on the display unit.

25. A process of identifying and providing interactive support service applications associated with consumer electronic devices, the process for execution by a server computing system that is communicatively coupled with at least one client computing system via the Internet, the process initiated at a client computing system for diagnosing problems with a particular consumer electronics device, comprising:
receiving device identification information from the client computing system, the device identification information indicating the particular consumer electronic device;
accessing a selected interactive support service application associated with the particular device based on said device identification information; and
providing said selected interactive support service application associated with the particular device to the client computing system, said selected interactive support application including instructions executable by the client computing system for providing an interactive support service process associated with the particular device, wherein said selected interactive support application comprises a diagnostic application including instructions executable by said client computing system to determine a current functional state of said particular device and determine diagnostic information based on said current functional state of said particular device, said diagnostic information indicating a problem associated with said selected device.

26. The process as recited in claim 25 wherein said device identification information comprises vendor information indicative of the vendor of the particular device, and model information indicative of the model of the particular device.

27. The process a recited in claim 26 wherein the device identification information further comprises a serial number of the particular device.

28. The process as recited in claim 25 wherein the client computer system is communicatively coupled with the particular device, and wherein said diagnostic application includes instructions executable by the client computing system for diagnosing problems associated with the particular device by communicating with the particular device, further comprising:
receiving diagnosis information from the client computing system, said diagnosis information indicating a diagnosed problem associated with the particular device that is determined as a result of execution of said interactive support service application by the client computing system; and
creating a database record based on said diagnosis information and said device identification information, said record indicating said diagnosed problem associated with the particular device.

29. The process as recited in claim 25 wherein said interactive support service application comprises instructions executable by the client computing system for generating a help menu enabling a user of the client computing system to select from a list of help topics associated with operation of the particular device, the process further comprising:
receiving information indicative of a selected help topic from the client computing system;
accessing a selected document based on said selected help topic; and
providing said selected document to the client computing system, said selected document providing educational information regarding operation of the particular device.

30. The process as recited in claim 29 wherein the client computer system is communicatively coupled with the particular device, and wherein said selected document further comprises embedded instructions executable by the client computing system for executing an interactive manual support service process for educating a user regarding operation of the particular device, said manual support service process including determining a current functional state of the particular device.

31. The process as recited in claim 25 wherein the client computer system is communicatively coupled with the particular device, and wherein said interactive support service application comprises instructions executable by the client computing system for implementing an interactive manual service for educating a user regarding operation of the particular device.

32. The process as recited in claim 25 wherein the client computer system is communicatively coupled with the particular device, and wherein said interactive support service application comprises instructions executable by the client computing system for implementing an interactive maintenance service enabling a user to solve maintenance problems associated with the particular device.

33. The process as recited in claim 28 wherein the client computing system is a gateway device communicatively coupled with said particular device via a home network, and wherein said diagnostic application comprises instructions executable by the gateway device for implementing a remote process comprising:
communicating with the particular device via the home network in order to determine said current functional state of the particular device; and
displaying information indicative of said current functional state of the particular device on a display unit.

34. The process as recited in claim 33 further comprising:
receiving information indicative of a current functional state of the particular device;
accessing a selected document based on the current functional state; and
providing said selected document to the gateway device, said selected document providing educational information regarding operation of the particular device taking into account its current functional state.

35. The process as recited in claim 33 wherein said remote interactive service process further comprises:
transmitting said diagnostic information to the client computing system; and
displaying said diagnostic information on the display unit.

36. The process as recited in claim 33 further comprising:
receiving diagnostic information from the client computing system, the diagnostic information indicating a problem associated with the particular device;

accessing a selected document based on the diagnostic information; and providing said selected document to the client computing system, said selected document providing instructions for solving the problem associated with the particular device.

37. The process as recited in claim 33 wherein said remote interactive service process further comprises:

determining user instructional information based on said current functional state of the particular device, said instructional information for providing instructions to the user for operating said selected device; and displaying said user instructional information on the display unit.

38. The process as recited in claim 35 wherein said remote interactive service process further comprises:

determining user instructional information based on said diagnostic information, said instructional information for providing instructions to the user for solving said problem associated with said selected device; and displaying said user instructional information on the display unit.

39. A process of identifying and providing interactive support service applications associated with consumer electronic devices, the process for execution by a server computing system that is communicatively coupled with at least one client computing system via the Internet, the client computing system being communicatively coupled with at least one electronic device, the process initiated at the client computing system for diagnosing problems with a particular consumer electronic device comprising:

receiving device identification information from the client computing system, the device identification information indicating the particular consumer electronic device that is communicatively coupled with the client computing system;

providing an interactive support service application associated with the particular device to the client computing system via the Internet, the application including instructions executable by the client computing system for providing an interactive support service process including determining a current functional state of said selected device and a problem associated with the particular device;

receiving diagnosis information from the client computing system, said diagnosis information indicating a diagnosed problem associated with the particular device that is determined as a result of execution of said instructions by the client computing system; and creating a database record based on said diagnosis information and said device identification information, said record indicating said diagnosed problem associated with the particular device.

40. The process as recited in claim 39 wherein said interactive support service application comprises instructions executable by the client computing system for generating a help menu enabling a user of the client computing system to select from a list of help topics associated with operation of the particular device, the process further comprising:

receiving information indicative of a selected help topic from the client computing system;

accessing a selected document based on said selected help topic; and providing said selected document to the client computing system, said selected document providing educational information regarding operation of the particular device.

41. The process as recited in claim 39 wherein said interactive support service application comprises instructions executable by the client computing system for generating a help menu enabling a user of the client computing system to select from a list of help topics associated with maintenance of the particular device, the process further comprising:

providing a selected document to the client computing system in response to information received from the client computing system indicating a selected help topic, said selected document providing instructional information associated with the particular device under the selected topic.

42. The process as recited in claim 39 wherein providing an interactive support service application comprises:

receiving a query including device identification information indicating the particular device from said client computing system; and determining said diagnostic service application associated with the particular device based on said device identification information.

43. The process as recited in claim 39 wherein said interactive support service application comprises instructions executable by the client computing system for executing an interactive manual service for educating a user regarding operation of the particular device.

44. The process as recited in claim 39 wherein said interactive support service application comprises instructions executable by the client computing system for executing an interactive maintenance service enabling a user to solve maintenance problems associated with the particular device.

45. The process as recited in claim 39 wherein the client computing system is a gateway device communicatively coupled with said particular device via a home network, and wherein said interactive support service application comprises instructions executable by the gateway device for implementing a remote interactive service process comprising:

communicating with the particular device via the home network in order to determine a current functional state of the particular device; and displaying information indicative of said current functional state of the particular device on a display unit.

46. The process as recited in claim 45 wherein said remote interactive service process further comprises:

determining diagnostic information based on said current functional state of the particular device, said diagnostic information indicating a problem associated with the particular device;

transmitting said diagnostic information to the client computing system; and displaying said diagnostic information on the display unit.

47. The process as recited in claim 45 wherein said remote interactive service process further comprises:

determining user instructional information based on said current functional state of the particular device, said instructional information for providing instructions to the user for operating said selected device; and displaying said user instructional information on the display unit.

48. The process as recited in claim 46 wherein said remote interactive service process further comprises:

determining user instructional information based on said diagnostic information, said instructional information for providing instructions to the user for solving said problem associated with said selected device; and displaying said user instructional information on the display unit.

49. The process as recited in claim 39 wherein providing an interactive support service application associated with a particular consumer electronic device comprises:

receiving device identification information from the client computing system, the device identification information including vendor information indicative of the vendor of the particular device, and model information indicative of the model of the particular device; and determining the interactive support service application associated with the particular device based on the device identification information.

50. The process as recited in claim 49 wherein the device identification information further comprises a serial number of the particular device.

51. The process as recited in claim 47 further comprising:

receiving information indicative of a current functional state of the particular device;

accessing a selected document based on the current functional state; and providing said selected document to the client computing system, said selected document providing educational information regarding operation of the particular device taking into account its current functional state.

52. The process as recited in claim 46 further comprising:

receiving diagnostic information from the client computing system, the diagnostic information indicating a problem associated with the particular device;

accessing a selected document based on the diagnostic information; and providing said selected document to the client computing system, said selected document providing instructions for solving the problem associated with the particular device.

53. A process of identifying and managing interactive support service applications associated with consumer electronic devices, the consumer electronic devices coupled together within a home network including a gateway device coupled to access the Internet and coupled to a display unit, the process executed by the gateway device comprising:

initiating a remote interactive diagnostic process at the gateway device, for automatically diagnosing problems with a selected one of the electronic devices, the remote interactive diagnostic process comprising:

determining device identification information associated with the selected one of the electronic devices for which a support service application is required;

providing the device identification information to a support server computing system via the Internet;

downloading an interactive support service application associated with the selected device from the support server computing system, the interactive support service application comprising a diagnostic application including instructions executable by the gateway device to determine a current functional state of the selected device and determine diagnostic information indicating a problem associated with the selected device based on the current functional state of the selected device; and executing the downloaded interactive support service application at the gateway device to provide a remote interactive support service process for the selected device.

54. A process of identifying and managing interactive support service applications associated with consumer electronic devices, the consumer electronic devices coupled together within a home network including a gateway device coupled to access the Internet and coupled to a display unit, the process executed by the gateway device comprising:

initiating a remote interactive diagnostic process at the gateway device, for automatically diagnosing problems with a selected one of the electronic devices, the remote interactive diagnostic process comprising:

determining device identification information associated with the selected one of the electronic devices for which a support service application is required;

providing the device identification information to a support server computing system via the Internet;

downloading an interactive support service application associated with the selected device from the support server computing system, the interactive support service application comprising one or more of a remote support service application regarding use of the selected device, a remote interactive diagnosis support service application enabling remote and interactive determination of a current functional state of the selected device and diagnostic information indicating a problem associated with the selected device based on the current functional state of the selected device, and a remote maintenance support service application providing for performance of remote maintenance functions on the selected device;

executing the downloaded interactive support service application at the gateway device to provide a remote interactive support service process for the selected device and to determine the current functional state of the selected device; and displaying information indicative of the current functional state of the selected device and user instructional information corresponding to the current functional state on the display unit.

* * * * *

UNITED STATES PATENT AND TRADEMARK OFFICE
CERTIFICATE OF CORRECTION

PATENT NO.         : 7,260,597 B1                                         Page 1 of 4
APPLICATION NO.    : 09/705478
DATED              : August 21, 2007
INVENTOR(S)        : Klaus Hofrichter et al.

It is certified that error appears in the above-identified patent and that said Letters Patent is hereby corrected as shown below:

TITLE PAGE
Delete title page showing an illustrative figure and substitute the attached title page therefor.

IN THE DRAWINGS
Delete figure 1 and substitute the attached figure 1.

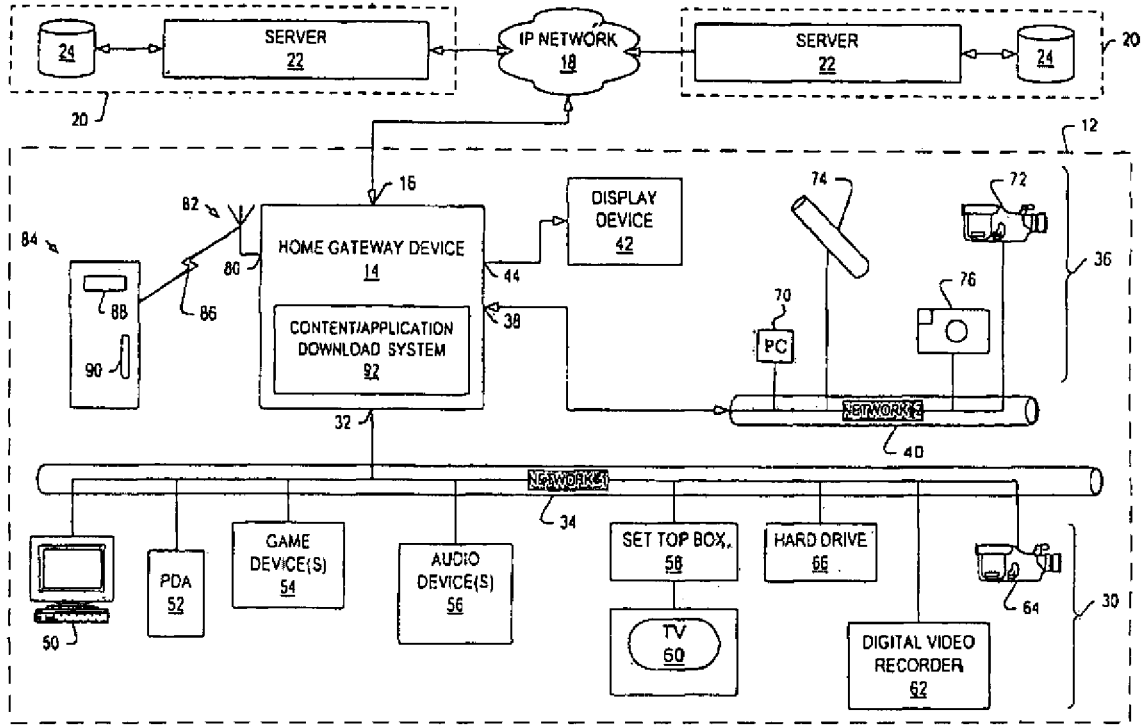

FIG. 1

Delete figure 3 and substitute figure 3 below therefor.

Delete figure 10 and substitute figure 10 below therefor.

Delete figure 11 and substitute figure 11 below therefor.

(12) United States Patent
Hofrichter et al.

(10) Patent No.: US 7,260,597 B1
(45) Date of Patent: Aug. 21, 2007

(54) REMOTE MANUAL, MAINTENANCE, AND DIAGNOSTIC SERVICES FOR NETWORKED ELECTRONIC DEVICES

(75) Inventors: Klaus Hofrichter, Santa Clara, CA (US); Joseph Alexander Dara-Abrams, Los Altos, CA (US); David Gabriel Gaxiola, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 665 days.

(21) Appl. No.: 09/705,478

(22) Filed: Nov. 2, 2000

(51) Int. Cl.
*G06F 11/00* (2006.01)
*G06F 17/30* (2006.01)

(52) U.S. Cl. .............. 709/200; 709/228; 707/10; 707/101; 707/102; 714/46; 714/48

(58) Field of Classification Search .......... 709/220, 709/223, 224, 221, 222, 200, 208, 228; 345/705, 345/714; 707/2, 102, 10, 229; 705/27, 29, 705/34, 400; 715/843, 513; 702/184; 700/9; 714/46, 31; 725/80, 82; 340/657, 292
See application file for complete search history.

(56) References Cited

U.S. PATENT DOCUMENTS

| | | | |
|---|---|---|---|
| 5,594,663 A * | 1/1997 | Messaros et al. ............ 702/184 |
| 5,678,002 A * | 10/1997 | Fawcett et al. ............ 345/709 |
| 5,961,561 A * | 10/1999 | Wakefield, II ............ 701/29 |
| 5,964,891 A * | 10/1999 | Caswell et al. ............ 714/31 |
| 6,014,651 A * | 1/2000 | Crawford ............ 705/400 |
| 6,023,507 A * | 2/2000 | Wookey ............ 709/224 |
| 6,167,448 A * | 12/2000 | Hemphill et al. ............ 709/224 |
| 6,198,479 B1 * | 3/2001 | Humpleman et al. ............ 345/733 |
| 6,321,262 B1 * | 11/2001 | Springer ............ 709/223 |
| 6,371,765 B1 * | 4/2002 | Wall et al. ............ 434/224 |
| 6,473,788 B1 * | 10/2002 | Kim et al. ............ 709/209 |
| 6,505,243 B1 * | 1/2003 | Lortz ............ 709/220 |
| 6,539,499 B1 * | 3/2003 | Stedman et al. ............ 714/40 |

(Continued)

OTHER PUBLICATIONS

Office Action dated Oct. 18, 2004 in U.S. Appl. No. 09/705,472.

*Primary Examiner*—Jeffrey Pwu
*Assistant Examiner*—Jude Jean-Gilles
(74) *Attorney, Agent, or Firm*—Haverstock & Owens LLP

(57) ABSTRACT

A process is provided for identifying and managing support service applications associated with consumer electronic devices. The process is executed by a gateway device communicatively coupled with each of the electronic devices via a home network, the gateway device being operative to access the Internet and being communicatively coupled with a display unit. The process includes the steps of: determining device ID information associated with a selected one of the electronic devices for which a support service application is required; providing the device ID information to a selected server computing system via the Internet; downloading a support service application associated with the selected device from the selected server computing system; and executing the downloaded support service application at the gateway device to provide a remote interactive support service process for the selected device. The support service may include a remote interactive manual service providing educational instructions to a user of the home network system regarding operation of a selected device, a remote interactive maintenance/diagnostic service for instructing a home network system user in solving maintenance problems associated with a selected device, or a combination remote interactive manual/maintenance/diagnostic service.

54 Claims, 8 Drawing Sheets